US012789892B2

(12) United States Patent
Uemura et al.

(10) Patent No.: US 12,789,892 B2
(45) Date of Patent: Nov. 10, 2026

(54) DRIVING ASSISTANCE DEVICE

(71) Applicant: HITACHI ASTEMO, LTD., Hitachinaka (JP)

(72) Inventors: Koichi Uemura, Tokyo (JP); Taku Takahama, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 190 days.

(21) Appl. No.: 18/558,225

(22) PCT Filed: Feb. 28, 2022

(86) PCT No.: PCT/JP2022/008418
§ 371 (c)(1),
(2) Date: Oct. 31, 2023

(87) PCT Pub. No.: WO2022/259643
PCT Pub. Date: Dec. 15, 2022

(65) Prior Publication Data
US 2024/0217580 A1 Jul. 4, 2024

(30) Foreign Application Priority Data
Jun. 8, 2021 (JP) ................................ 2021-096057

(51) Int. Cl.
*B62D 15/02* (2006.01)

(52) U.S. Cl.
CPC ................................ *B62D 15/025* (2013.01)

(58) Field of Classification Search
CPC ....... B60W 30/18163; B60W 2520/10; B60W 2554/4041; B60W 2554/4042;
(Continued)

(56) References Cited

U.S. PATENT DOCUMENTS

2005/0228588 A1 10/2005 Braeuchle et al.
2017/0197618 A1 7/2017 Ali et al.
(Continued)

FOREIGN PATENT DOCUMENTS

DE 10218010 A1 11/2003
JP 2010-006271 A 1/2010
(Continued)

OTHER PUBLICATIONS

International Search Report with English Translation and Written Opinion of International Patent Application No. PCT/JP2022/008418 dated Mar. 29, 2022 (9 pages).
(Continued)

*Primary Examiner* — Jerrod Irvin Davis
(74) *Attorney, Agent, or Firm* — Foley & Lardner LLP

(57) ABSTRACT

An object of the present invention is to execute steering control depending on a situation in an adjacent lane. A driving assistance device according to the present invention includes: at least one sensor (140) configured to acquire vehicle surrounding information; and at least one processor configured to: execute determination processing of determining whether a current situation is a first situation or a second situation based on the vehicle surrounding information; and execute steering control for driving a principal vehicle along a target track (TL) based on a result of the determination processing. The first situation is a situation in which the principal vehicle overtakes a first other vehicle traveling in a first adjacent lane. The second situation is a situation in which the principal vehicle is overtaken by the first other vehicle traveling in the first adjacent lane.

11 Claims, 16 Drawing Sheets

(58) Field of Classification Search
CPC . B60W 2554/4044; B60W 2554/4045; B60W 2554/406; B60W 2554/802; B60W 30/0956; B60W 30/10; B60W 30/12; G08G 1/167; G08G 1/096716; G08G 1/096725; G08G 1/096741; G08G 1/096775; G08G 1/096791; G08G 1/16; G08G 1/163; G06V 20/58; G06V 20/588; B62D 15/025
See application file for complete search history.

(56) References Cited

U.S. PATENT DOCUMENTS

| | | | | |
|---|---|---|---|---|
| 2019/0278285 | A1* | 9/2019 | Umeda | B60W 30/18154 |
| 2019/0389461 | A1* | 12/2019 | Ohmura | B60W 30/146 |
| 2020/0148259 | A1* | 5/2020 | Nagae | B62D 15/025 |
| 2020/0255007 | A1 | 8/2020 | Tsuji et al. | |
| 2021/0031804 | A1* | 2/2021 | Oyama | B60W 60/0025 |
| 2023/0406316 | A1* | 12/2023 | Kume | B60W 60/001 |

FOREIGN PATENT DOCUMENTS

| | | | |
|---|---|---|---|
| JP | 2017-061241 | A | 3/2017 |
| JP | 2019-156295 | A | 9/2019 |
| JP | 2020-128167 | A | 8/2020 |
| JP | 2020-158090 | A | 10/2020 |

OTHER PUBLICATIONS

German Office Action issued in corresponding DE Application No. 112022001348.6 dated Oct. 20, 2025 with English translation (11 pages).

* cited by examiner

| Dy | ADDITION VALUE / SUBTRACTION VALUE |
|---|---|
| Dy<Dy1 | +2.0 |
| Dy1≤Dy≤Dy2 | +1.0 |
| Dy2≤Dy≤Dy3 | 0 |
| Dy3<Dy | -1.0 |

FIG. 21

| SITUATION WHERE Dx IS NEGATIVE VALUE | RELATIONSHIP WITH FIRST ADJACENT VEHICLE | | |
|---|---|---|---|
| | PRINCIPAL VEHICLE GRADUALLY APPROACHES FIRST ADJACENT VEHICLE | PRINCIPAL VEHICLE GRADUALLY BECOMES DISTANT FROM FIRST ADJACENT VEHICLE | CHANGE IN Dx IS SMALL |
| Dx>Dx1 | +1.0 | -1.0 | 0 |
| Dx2≦Dx≦Dx1 | +0.5 | -0.5 | 0 |
| Dx<Dx2 | -0.5 | -0.5 | -0.5 |

DRIVING ASSISTANCE DEVICE

TECHNICAL FIELD

The present disclosure relates to a driving assistance device.

BACKGROUND ART

Conventionally, there has been proposed a driving assistance device configured to execute steering control based on a surrounding situation of a vehicle (see, for example, PTL 1).

CITATION LIST

Patent Literature

PTL 1: JP 2010-006271 A

SUMMARY OF INVENTION

Technical Problem

Hereinafter, a vehicle on which such a driving assistance device is mounted is referred to as "principal vehicle", and a vehicle present around the principal vehicle is referred to as "other vehicle". Further, a lane in which the principal vehicle is traveling is referred to as "principal vehicle lane", and a lane adjacent to the principal vehicle lane is referred to as "adjacent lane".

For example, there may be a situation in which another vehicle is traveling in the adjacent lane and the principal vehicle overtakes the other vehicle. In this situation, the driver of the principal vehicle may feel uneasy because the distance between the principal vehicle and the other vehicle decreases. However, any processing in such a situation has not been studied for the driving assistance device of PTL 1. The above problem may also occur in a situation in which the principal vehicle is overtaken by another vehicle.

An object of the present disclosure is to provide a driving assistance device capable of executing steering control depending on the situations described above.

Solution to Problem

In one or more embodiments, a driving assistance device is provided. The driving assistance device includes: at least one sensor configured to acquire vehicle surrounding information pertaining to a surrounding area of a principal vehicle; and at least one processor configured to: execute determination processing of determining whether a current situation is a first situation or a second situation based on the vehicle surrounding information; and execute steering control for driving the principal vehicle along a target track based on a result of the determination processing. The first situation is a situation in which the principal vehicle overtakes a first other vehicle traveling in a first adjacent lane adjacent to a principal vehicle lane in which the principal vehicle is traveling. The second situation is a situation in which the principal vehicle is overtaken by the first other vehicle.

Advantageous Effects of Invention

According to the above configuration, the driving assistance device can execute the steering control depending on whether the current situation is the first situation or the second situation. Problems, configurations, and advantageous effects other than those described above will be clarified by the following description of embodiments.

BRIEF DESCRIPTION OF DRAWINGS

FIG. 21 is a table for calculating the reliability DR, and the table illustrates a relationship between a distance Dx and an addition value/subtraction value, where the distance Dx is a distance in a vehicle longitudinal direction between the principal vehicle and a first adjacent vehicle.

DESCRIPTION OF EMBODIMENTS

A plurality of embodiments of a driving assistance device will be described with reference to the accompanying drawings. Although the accompanying drawings illustrate specific configurations, they are not used to interpret the technical scope of the present disclosure in a limited manner.

As an example of steering control, lane keeping control will be described below. Hereinafter, the lane keeping control is simply referred to as "LK control".

First Embodiment (Configuration of Driving Assistance Device)

Figure 1:
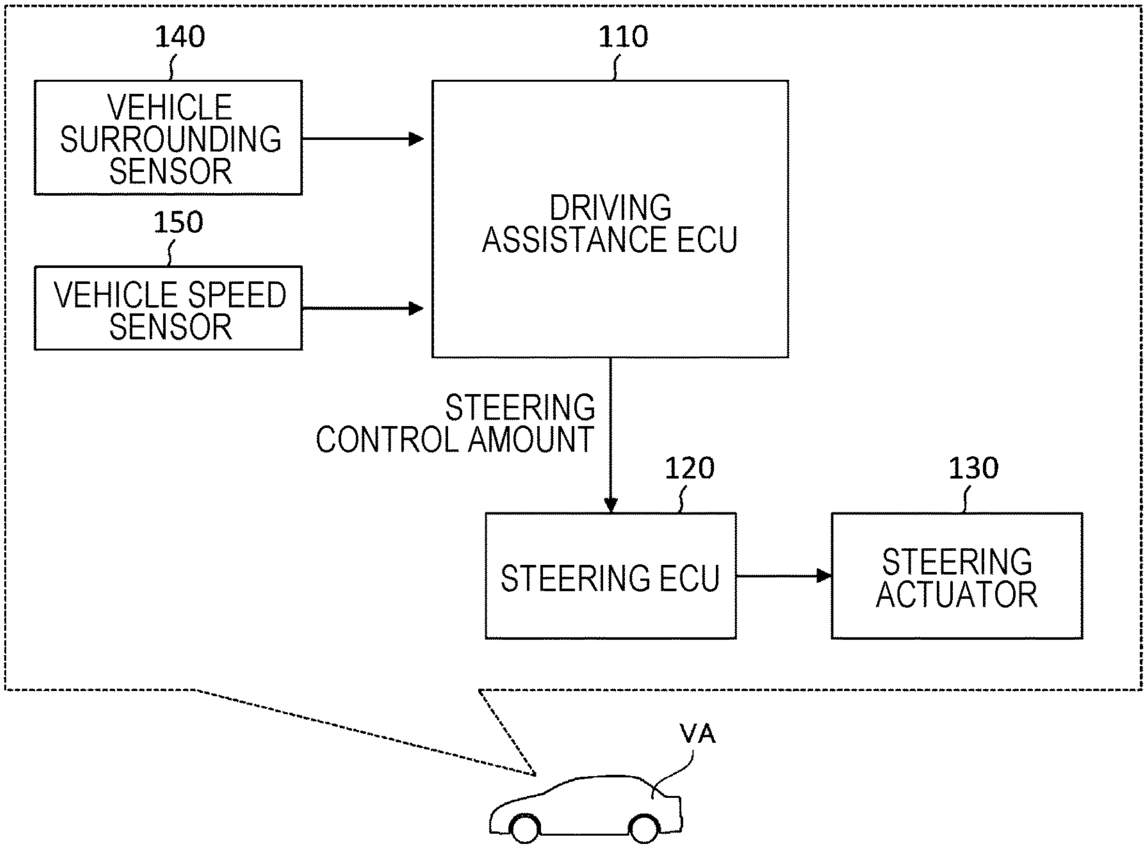
FIG. 1 is a diagram illustrating a configuration of a driving assistance device.

FIG. 1 is a diagram illustrating a configuration of the driving assistance device. The driving assistance device is mounted on a vehicle (principal vehicle) VA. The driving assistance device includes a driving assistance ECU 110, a steering ECU 120, a steering actuator 130, a vehicle surrounding sensor 140, and a vehicle speed sensor 150.

Figure 2:
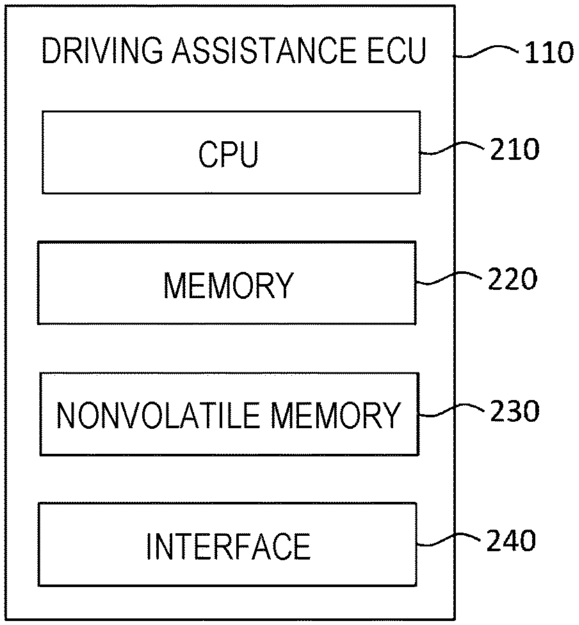
FIG. 2 is a diagram illustrating a configuration of a driving assistance ECU.

FIG. 2 is a diagram illustrating a configuration of the driving assistance ECU 110. An ECU, which is an abbreviation of an electronic control unit, is an electronic control circuit having a microcomputer as a component. The driving assistance ECU 110 includes a CPU 210, a memory 220, a nonvolatile memory 230, an interface 240, and the like.

The CPU 210 includes at least one processor and/or circuit. The memory 220 includes, for example, a RAM. The nonvolatile memory 230 includes, for example, a flash memory and a ROM. The CPU 210 executes a program code (instruction) stored in the nonvolatile memory 230 by using the memory 220 as a working memory. As a result, the CPU 210 can execute processing described below. Note that the steering ECU 120 has a similar configuration.

The steering actuator 130 is incorporated in a steering mechanism of the vehicle VA. For example, the steering actuator 130 includes a motor for steering wheels (left front wheel and right front wheel) of the vehicle VA. The steering actuator 130 is configured to control the steering wheels in accordance with an instruction from the steering ECU 120.

Note that the driving assistance ECU 110 and the steering ECU 120 may be integrated into one ECU. Further, one or more ECUs may be added to execute processing described below.

The vehicle surrounding sensor 140 acquires vehicle surrounding information pertaining to a surrounding area of the vehicle VA. The surrounding area of the vehicle VA includes a front area, a right area, a left area, and a rear area of the vehicle VA.

The vehicle surrounding information includes object information pertaining to objects present in the surrounding area of the vehicle VA, and lane marking information pertaining to lane markings (white lines) present in the surrounding area of the vehicle VA. The objects include moving objects such as a vehicle and a pedestrian, and stationary objects such as a guardrail and a fence. The object information includes, for example, a distance between the vehicle VA and the object, a direction of movement of the object with respect to the vehicle VA, an azimuth of the object with respect to the vehicle VA, a relative speed of the object with respect to the vehicle VA, a type of the object (for example, information indicating whether the object is a moving object or a stationary object), and the like. The lane marking information includes positions of a plurality of lane markings that define lanes (traffic lanes), parameters related to the lane markings, and the like. The parameters related to a lane marking include a curvature of the lane marking, a lateral position (position in a road width direction) of the vehicle VA with respect to the lane marking, a yaw angle of the vehicle VA with respect to the lane marking, and the like.

For example, the vehicle surrounding sensor 140 may be one or a combination of a radar sensor, a camera sensor, a LIDAR, and the like. The vehicle surrounding sensor 140 may include another sensor as long as it can acquire the object information and the lane marking information.

The vehicle speed sensor 150 acquires information on a speed Va of the vehicle VA.

(LK Control)

Figure 3:
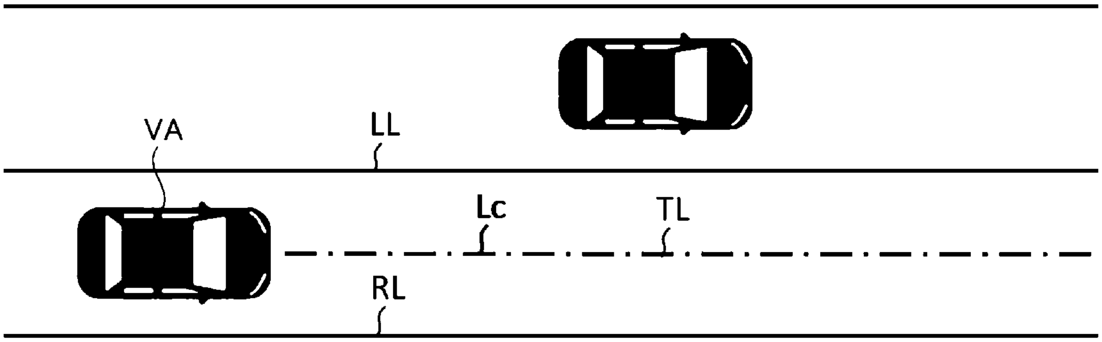
FIG. 3 is a diagram for explaining lane keeping control which is an example of steering control.

FIG. 3 is a diagram for explaining LK control which is an example of steering control. The driving assistance ECU 110 detects a left lane marking LL and a right lane marking RL based on the vehicle surrounding information (lane marking information). The driving assistance ECU 110 recognizes an area between the left lane marking LL and the right lane marking RL as an area where the vehicle VA should travel (that is, the lane). The driving assistance ECU 110 sets, as a center line Lc, a line connecting center positions in the road width direction between the left lane marking LL and the right lane marking RL. Then, the driving assistance ECU 110 sets the center line Lc as a target track TL of the LK control. The driving assistance ECU 110 calculates a steering control amount (for example, steering torque) for driving the vehicle VA along the target track TL. The driving assistance ECU 110 outputs the steering control amount to the steering ECU 120. The steering ECU 120 controls the steering actuator 130 based on the steering control amount.

Next, a plurality of situations that may occur during execution of the LK control will be described. Hereinafter, the vehicle VA on which the driving assistance device is mounted is referred to as "principal vehicle VA". Further, a lane in which the principal vehicle VA is traveling is referred to as "principal vehicle lane Ln0", a lane adjacent to the left side of the principal vehicle lane Ln0 is referred to as "first adjacent lane Ln1", and a lane adjacent to the right side of the principal vehicle lane Ln0 is referred to as "second adjacent lane Ln2". Another vehicle traveling in the first adjacent lane Ln1 or the second adjacent lane In2 is referred to as "adjacent vehicle".

(Steering Control in First Situation)

Figure 4:
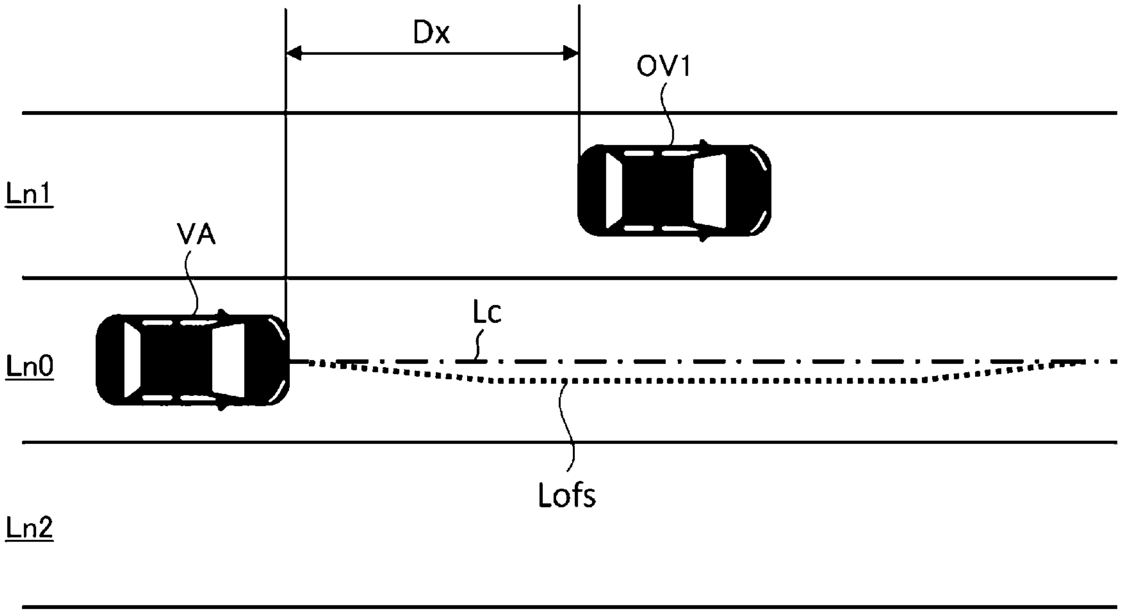
FIG. 4 is a diagram illustrating a situation (first situation) in which a principal vehicle overtakes a first adjacent vehicle traveling in a first adjacent lane.

FIG. 4 is a diagram illustrating a situation in which a first adjacent vehicle OV1 is traveling in the first adjacent lane Ln1 and the principal vehicle VA overtakes the first adjacent vehicle OV1. Hereinafter, such a situation is referred to as "first situation".

In the first situation, the principal vehicle VA gradually approaches the first adjacent vehicle OV1. The driver of the principal vehicle VA recognizes the first adjacent vehicle OV1, and thus feels uneasy when the principal vehicle VA passes by the first adjacent vehicle OV1. In consideration of this, the driving assistance ECU 110 changes elements of the LK control (hereinafter, referred to as "control elements"). Here, the control elements mean various processes for executing the LK control and parameters used for the processes. Specifically, the control elements include the target track TL serving as a reference of the LK control, a control gain used for the steering control amount of the LK control, and the like. In this example, the control element is the target track TL.

In the first situation, the driving assistance ECU 110 calculates a line Lofs further away from the first adjacent lane Ln1. For this reason, the driving assistance ECU 110 obtains a correction value dc of the lateral position of the principal vehicle VA with respect to the center line Lc. Here, the lateral position of the principal vehicle VA means a position in the road width direction in the principal vehicle lane In0. The line Lofs is a line offset by the correction value dc to the right side from the center line Lc.

Figure 5:
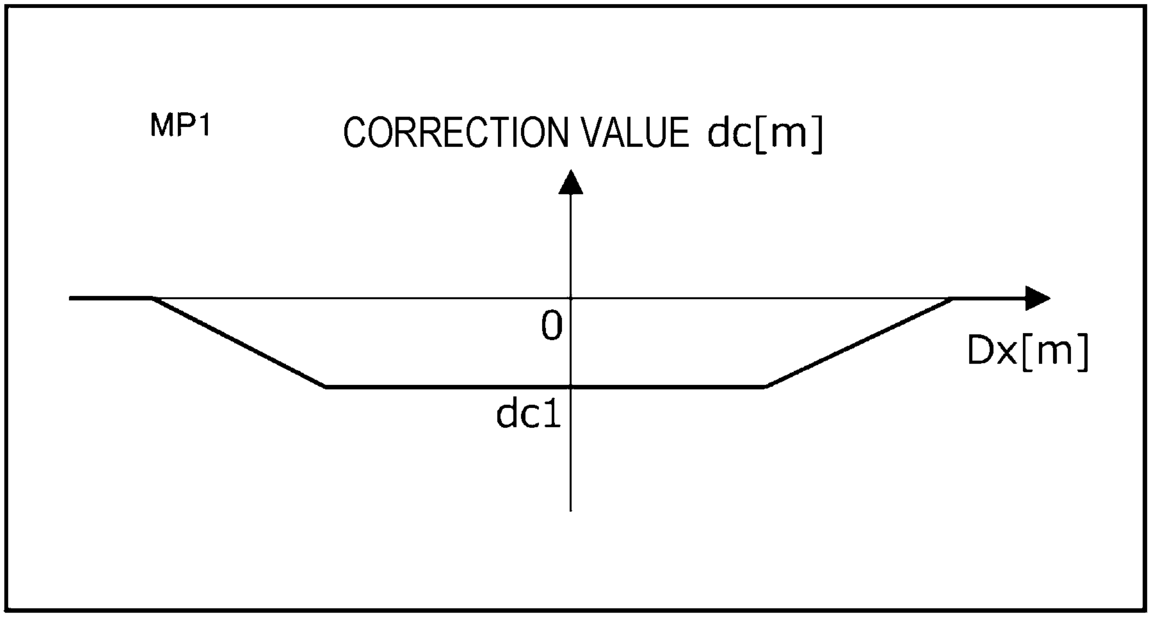
FIG. 5 is an example of a map for obtaining a correction value dc of a lateral position of the principal vehicle.

FIG. 5 is a map MP1 for obtaining the correction value dc. The map MP1 defines a relationship between a distance Dx and the correction value dc, where the distance Dx is a distance in a vehicle longitudinal direction between the principal vehicle VA and a first adjacent vehicle OV1. When the distance Dx is a negative value, this means that the principal vehicle VA is present behind the first adjacent vehicle OV1. When the distance Dx is zero, this means that the principal vehicle VA is present just beside the first adjacent vehicle OV1. When the distance Dx is a positive value, this means that the principal vehicle VA is present ahead of the first adjacent vehicle OV1. When the correction value dc is a positive value, this means that the lateral position of the principal vehicle VA is offset to the left side from the center line Lc. On the other hand, when the correction value dc is a negative value, this means that the lateral position of the principal vehicle VA is offset to the right side from the center line Lc. Thus, the map MP1 is a map for offsetting the lateral position of the principal vehicle VA to the right side from the center line Lc.

The driving assistance ECU 110 obtains the correction value dc in accordance with the map MP1. According to the map MP1, when the principal vehicle VA approaches the first adjacent vehicle OV1 (the magnitude (absolute value) of the distance Dx decreases), the correction value dc becomes a negative predetermined value dc1 (for example, −0.4 m). That is, the principal vehicle VA moves further away from the first adjacent lane Ln1. Thereafter, the principal vehicle VA overtakes the first adjacent vehicle OV1. Subsequently, the correction value dc gradually approaches zero and finally becomes zero. That is, the lateral position of the principal vehicle VA returns to the center line Lc. Note that the value dc1 may be appropriately changed so that the principal vehicle VA does not deviate from the principal vehicle lane Ln0.

The driving assistance ECU 110 sets the line Lofs as the target track TL. The driving assistance ECU 110 calculates the steering control amount for driving the vehicle VA along the target track TL. The driving assistance ECU 110 outputs the steering control amount to the steering ECU 120. According to this configuration, even when the first situation occurs during execution of the LK control, the driving assistance ECU 110 executes the first control, so that the principal vehicle VA passes on the right side of the first adjacent vehicle OV1 with the larger interval from the first adjacent vehicle OV1. The possibility that the driver feels uneasy can be reduced. Further, the driving assistance ECU 110 gradually changes the correction value dc in accordance with the distance Dx using the map MP1. According to this configuration, the lateral position of the vehicle VA can be smoothly changed in accordance with the distance Dx.

Hereinafter, the steering control executed in the first situation (that is, the steering control using the line Lofs as the target track TL) is referred to as "first control".

Note that the driving assistance ECU 110 determines a first start condition based on the vehicle surrounding information in order to start the first control. The first start condition is a condition for determining whether the current situation is the first situation. Specifically, the first start condition is satisfied when both of the following condition A1 and condition A2 are satisfied. Note that the condition A2 may be changed to a condition related to an inter-vehicle time between the principal vehicle VA and a first adjacent vehicle OV1.

(Condition A1): speed Va of principal vehicle VA>speed V1 of first adjacent vehicle OV1

(Condition A2): distance Dx>first distance threshold Dxth1 (predetermined negative value)

Further, the driving assistance ECU 110 determines a first end condition based on the vehicle surrounding information in order to end the first control. The first end condition is a condition for determining whether the principal vehicle VA has completed overtaking the first adjacent vehicle OV1. Specifically, the first end condition is satisfied when the following condition B1 is satisfied. Note that the condition B1 may be changed to a condition related to the inter-vehicle time between the principal vehicle VA and the first adjacent vehicle OV1.

(Condition B1): distance Dx≥second distance threshold Dxth2 (predetermined positive value)

(Steering Control in Second Situation)

Figure 6:
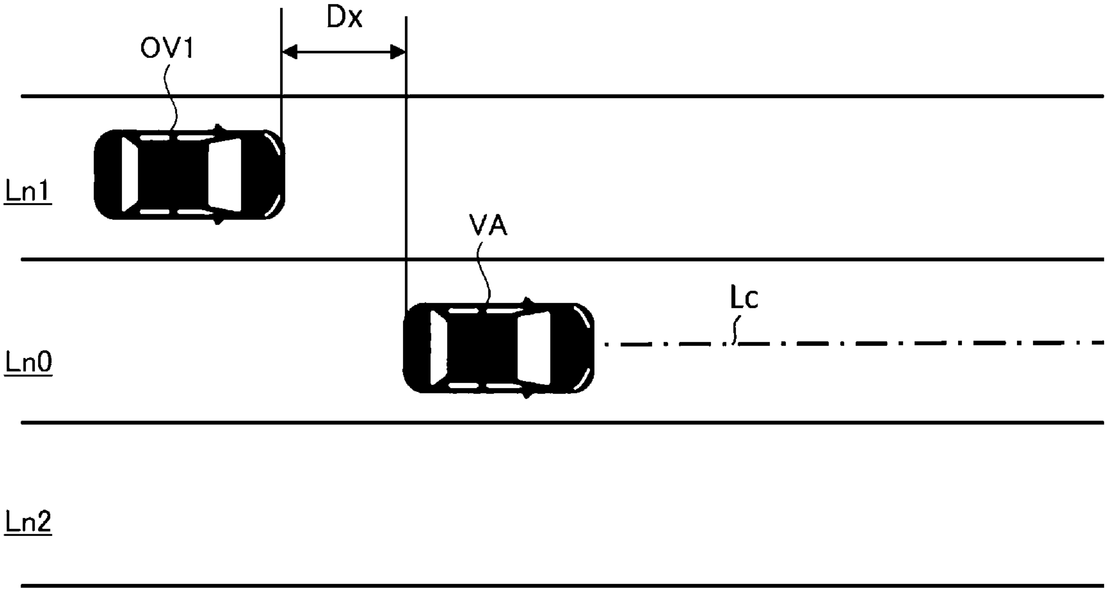
FIG. 6 is a diagram illustrating a situation (second situation) in which the principal vehicle is overtaken by a first adjacent vehicle traveling in the first adjacent lane.

FIG. 6 is a diagram illustrating a situation in which a first adjacent vehicle OV1 is traveling in the first adjacent lane Ln1 and the principal vehicle VA is overtaken by the first adjacent vehicle OV1. Hereinafter, such a situation is referred to as "second situation".

In the second situation, the first adjacent vehicle OV1 gradually approaches the principal vehicle VA. However, the first adjacent vehicle OV1 is present behind the principal vehicle VA, and thus the driver of the principal vehicle VA cannot recognize the first adjacent vehicle OV1 in many cases. Let us assume that the driving assistance ECU 110 executes the first control in such a second situation. In this case, the driver feels that the principal vehicle VA has suddenly moved to the right side and rather feel uneasy.

In consideration of this, in the second situation, the driving assistance ECU 110 executes the steering control using the center line Lc as the target track TL. The driving assistance ECU 110 sets the center line Lc as the target track TL. The driving assistance ECU 110 calculates the steering control amount for driving the vehicle VA along the target track TL. The driving assistance ECU 110 outputs the steering control amount to the steering ECU 120. According to this configuration, even when the second situation occurs during execution of the LK control, the driving assistance ECU 110 executes the second control, so that the principal vehicle VA does not move in the lateral direction. The possibility that the driver feels uneasy can be reduced.

Hereinafter, the steering control executed in the second situation (that is, the steering control using the center line Lc as the target track TL) is referred to as "second control".

Note that the driving assistance ECU 110 determines a second start condition based on the vehicle surrounding information in order to start the second control. The second start condition is a condition for determining whether the current situation is the second situation. Specifically, the second start condition is satisfied when both of the following condition C1 and condition C2 are satisfied. Note that the condition C2 may be changed to a condition related to the inter-vehicle time between the principal vehicle VA and a first adjacent vehicle OV1.

(Condition C1): speed Va of principal vehicle VA<speed V1 of first adjacent vehicle OV1

(Condition C2): distance Dx≤third distance threshold Dxth3 (predetermined positive value)

Further, the driving assistance ECU 110 determines a second end condition based on the vehicle surrounding information in order to end the second control. The second end condition is a condition for determining whether the first adjacent vehicle OV1 has completed overtaking the principal vehicle VA. Specifically, the second end condition is satisfied when the following condition D1 is satisfied. Note that the condition D1 may be changed to a condition related to the inter-vehicle time between the principal vehicle VA and the first adjacent vehicle OV1.

(Condition D1): distance Dx≥fourth distance threshold Dxth4 (predetermined negative value)

(Steering Control in Normal Situation)

Hereinafter, a situation that is neither the first situation nor the second situation is referred to as "normal situation". In the normal situation, the driving assistance ECU 110 executes the steering control using the center line Lc as the target track TL. Specifically, the driving assistance ECU 110 sets the center line Lc as the target track TL. The driving assistance ECU 110 calculates the steering control amount for driving the vehicle VA along the target track TL. The driving assistance ECU 110 outputs the steering control amount to the steering ECU 120.

The steering control executed in the normal situation (that is, the control using the center line Lc as the target track TL) is referred to as "normal control".

(Processing Flow)

Figure 7:
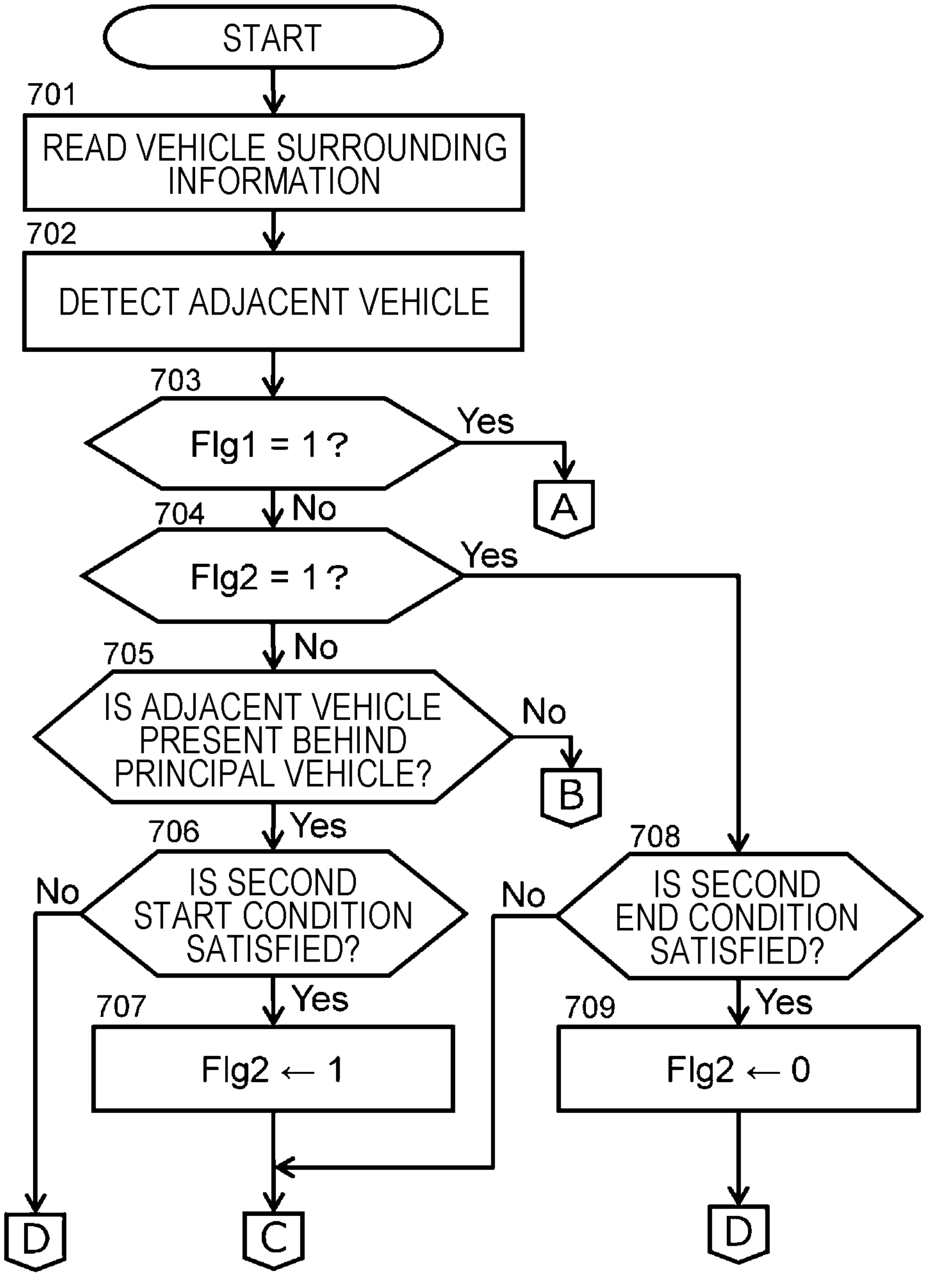
FIG. 7 is a flowchart executed by the driving assistance ECU in a first embodiment.
Figure 8:
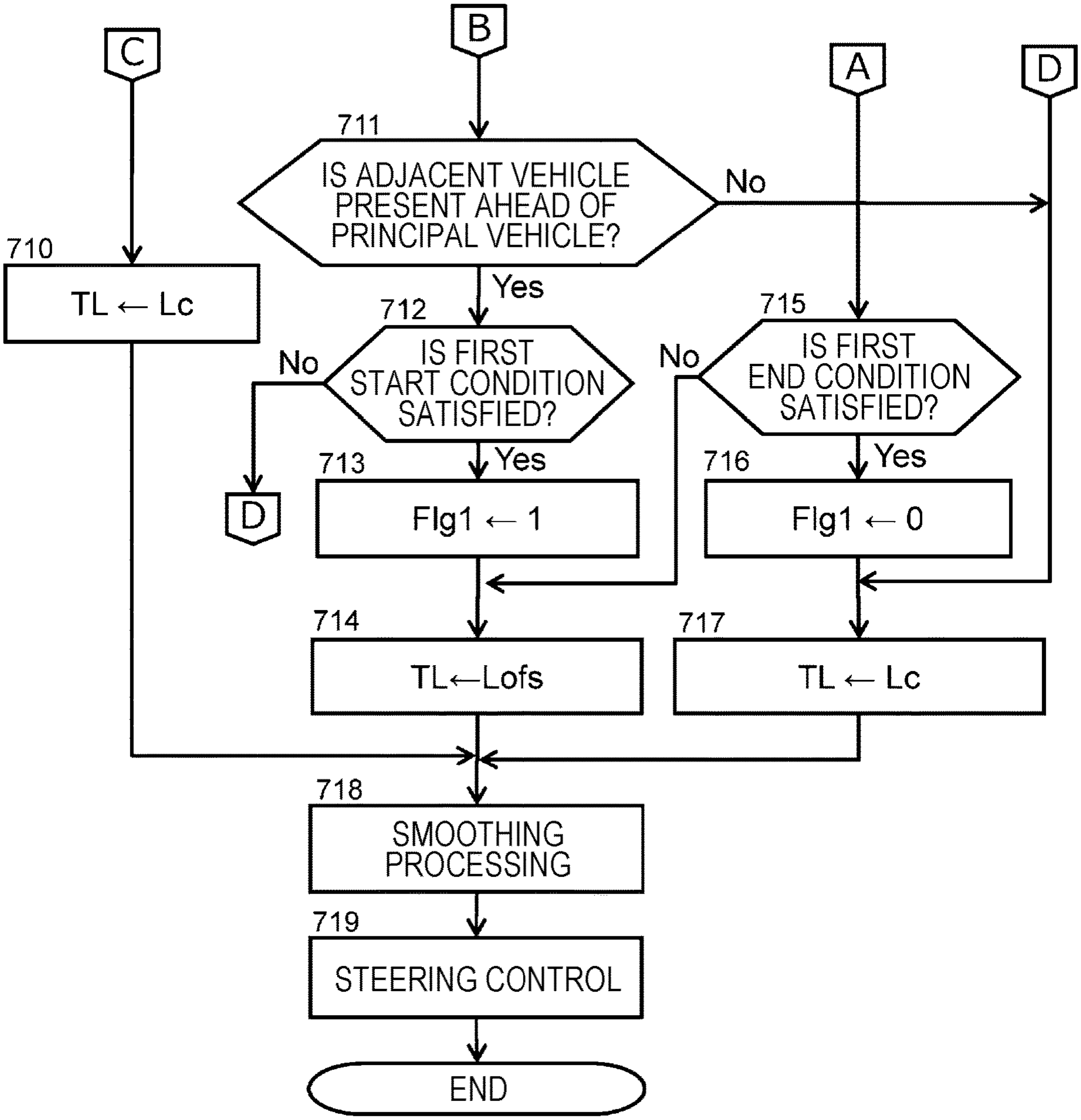
FIG. 8 is a flowchart executed by the driving assistance ECU in the first embodiment.

FIGS. 7 and 8 are flowcharts illustrating a routine executed by the driving assistance ECU 110 according to the first embodiment. The driving assistance ECU 110 repeatedly executes the routine of FIGS. 7 and 8 at a predetermined cycle dT (for example, 50 ms). Respective processing flows for the "normal situation", the "first situation", and the "second situation" will be described below.

•Normal Situation

The driving assistance ECU 110 reads the vehicle surrounding information (step 701). The driving assistance ECU 110 detects an adjacent vehicle based on the vehicle surrounding information (step 702). Note that the current situation is the normal situation and thus the driving assistance ECU 110 detects no adjacent vehicle.

The driving assistance ECU 110 determines whether a first flag Flg1 is "1" (step 703). When the first flag Flg1 is "1", this means that the current situation is the first situation. When the first flag Flg1 is "0", this means that the current situation is not the first situation. Assuming that the first flag Flg1 is currently "0", the driving assistance ECU 110 determines "No" and proceeds to step 704.

The driving assistance ECU 110 determines whether a second flag Flg2 is "1" (step 704). When the second flag Flg2 is "1", this means that the current situation is the second situation. When the second flag Flg2 is "0", this means that the current situation is not the second situation. Assuming that the second flag Flg2 is currently "0", the driving assistance ECU 110 determines "No" and proceeds to step 705.

The driving assistance ECU 110 determines whether an adjacent vehicle is present behind the principal vehicle VA (step 705). In the normal situation, the driving assistance ECU 110 determines "No" and proceeds to step 711 (from B in FIG. 7 to B in FIG. 8). The driving assistance ECU 110 determines whether an adjacent vehicle is present ahead of the principal vehicle VA (step 711). The driving assistance ECU 110 determines "No" and proceeds to step 717. The driving assistance ECU 110 executes the normal control as described above. The driving assistance ECU 110 sets the center line Lc as the target track TL (step 717). Next, the driving assistance ECU 110 executes smoothing processing on the target track TL (step 718). The smoothing processing is processing of making the target track TL a smooth curve so that the target track TL has no stepped change. Then, the driving assistance ECU 110 executes the steering control (step 719). Specifically, the driving assistance ECU 110 calculates the steering control amount for driving the vehicle VA along the target track TL. The driving assistance ECU 110 outputs the steering control amount to the steering ECU 120. The steering ECU 120 controls the steering actuator 130 based on the steering control amount.

•First Situation

Let us assume that the current situation is the situation of FIG. 4 and the principal vehicle VA is about to overtake the first adjacent vehicle OV1. In this case, the driving assistance ECU 110 executes step 701, step 702, step 703, and step 704, and then proceeds to step 705.

Note that, in step 702, the driving assistance ECU 110 may treat an adjacent vehicle satisfying the following condition E1 or condition E2 as a vehicle subject to the processing described below.

(Condition E1): The distance in the road width direction between the principal vehicle VA and an adjacent vehicle is equal to or less than a predetermined distance.

(Condition E2): The distance in the road width direction between a lane marking defining the principal vehicle lane Ln0 and an adjacent vehicle is equal to or less than a predetermined distance.

This is for the following reason. For example, in a case where the distance in the road width direction between the principal vehicle VA and an adjacent vehicle is relatively large, the driver of the principal vehicle VA is less likely to feel uneasy even when the principal vehicle VA passes by the adjacent vehicle.

The driving assistance ECU 110 determines "No" in step 705 and proceeds to step 711 (from B in FIG. 7 to B in FIG. 8). The driving assistance ECU 110 determines whether an adjacent vehicle is present ahead of the principal vehicle VA (step 711). The driving assistance ECU 110 determines "Yes" and proceeds to step 712.

The driving assistance ECU 110 determines whether or not the first start condition is satisfied (step 712). When the first start condition is not satisfied, the driving assistance ECU 110 determines "No" and proceeds to step 717 (from D to D in FIG. 8). The driving assistance ECU 110 executes the normal control as described above.

In the situation of FIG. 4, the first start condition is satisfied. Thus, the driving assistance ECU 110 determines "Yes" and proceeds to step 713. The driving assistance ECU 110 sets the first flag Flg1 to "1" (step 713). Then, the driving assistance ECU 110 executes the first control. The driving assistance ECU 110 calculates the line Lofs using the map MP1 as described above. The driving assistance ECU 110 sets the line Lofs as the target track TL (step 714). Next, the driving assistance ECU 110 executes smoothing processing on the target track TL (step 718). Then, the driving assistance ECU 110 executes the steering control (step 719).

Thereafter, the driving assistance ECU 110 executes step 701 and step 702, and then proceeds to step 703. The driving assistance ECU 110 determines "Yes" and proceeds to step 715 (from A in FIG. 7 to A in FIG. 8).

The driving assistance ECU 110 determines whether or not the first end condition is satisfied (step 715). When the first end condition is not satisfied, the driving assistance ECU 110 continues the first control. That is, the driving assistance ECU 110 determines "No" and executes step 714, step 718, and step 719.

When the first end condition is satisfied, the driving assistance ECU 110 determines "Yes" and proceeds to step 716. The driving assistance ECU 110 sets the first flag Flg1 to "0" (step 716). The driving assistance ECU 110 ends the first control and executes the normal control. The driving assistance ECU 110 sets the center line Lc as the target track TL (step 717). Next, the driving assistance ECU 110 executes smoothing processing on the target track TL (step 718). Then, the driving assistance ECU 110 executes the steering control (step 719).

•Second Situation

Let us assume that the current situation is the situation of FIG. 6 and the first adjacent vehicle OV1 is about to overtake the principal vehicle VA. In this case, the driving assistance ECU 110 executes step 701, step 702, step 703, and step 704, and then proceeds to step 705. The driving assistance ECU 110 determines "Yes" and proceeds to step 706.

The driving assistance ECU 110 determines whether or not the second start condition is satisfied (step 706). When the second start condition is not satisfied, the driving assistance ECU 110 determines "No" and proceeds to step 717 (from D in FIG. 7 to D in FIG. 8). The driving assistance ECU 110 executes the normal control as described above.

In the situation of FIG. 6, the second start condition is satisfied. Thus, the driving assistance ECU 110 determines "Yes" and proceeds to step 707. The driving assistance ECU 110 sets the second flag Flg2 to "1" (step 707). Then, the driving assistance ECU 110 executes the second control. The driving assistance ECU 110 proceeds to step 710 (from C in FIG. 7 to C in FIG. 8). The driving assistance ECU 110 sets the center line Lc as the target track TL (step 710). The driving assistance ECU 110 executes the smoothing processing on the target track TL (step 718). Then, the driving assistance ECU 110 executes the steering control (step 719).

Thereafter, the driving assistance ECU 110 executes step 701, step 702, and step 703, and then proceeds to step 704. The driving assistance ECU 110 determines "Yes" and proceeds to step 708.

The driving assistance ECU 110 determines whether or not the second end condition is satisfied (step 708). When the second end condition is not satisfied, the driving assistance ECU 110 continues the second control. That is, the driving assistance ECU 110 determines "No" and proceeds to step 710 (from C in FIG. 7 to C in FIG. 8).

When the second end condition is satisfied, the driving assistance ECU 110 determines "Yes" and proceeds to step 709. The driving assistance ECU 110 sets the second flag Flg2 to "0" (step 709). Then, the driving assistance ECU 110 ends the second control and executes the normal control. The driving assistance ECU 110 proceeds to step 717 (from D in FIG. 7 to D in FIG. 8). The driving assistance ECU 110 sets the center line Lc as the target track TL (step 717). Next, the driving assistance ECU 110 executes smoothing processing on the target track TL (step 718). Then, the driving assistance ECU 110 executes the steering control (step 719).

Advantageous Effects

According to the above configuration, the driving assistance ECU 110 executes the determination processing of determining whether the current situation is the first situation or the second situation based on the vehicle surrounding information, and executes the steering control for driving the principal vehicle VA along the target track TL based on the result of the determination processing. The driving assistance ECU 110 controls the lateral position of the principal vehicle VA by setting (or changing) the target track TL depending on the determined situation (the first situation or the second situation). This can enhance the driver's feeling of security.

Modification Example

The driving assistance ECU 110 may set the control gain of the steering control to be larger when used in the second situation than when used in a situation other than the second situation. In this configuration, when the driver of the principal vehicle VA operates the steering wheel in the second situation, the driving assistance ECU 110 applies, to the steering mechanism, a large torque for returning the lateral position of the principal vehicle VA to the target track TL. Thus, the driver feels a large load when operating the steering wheel. Thus, the lateral position of the principal vehicle VA is easily kept on the target track TL (center line Lc). It is possible to prevent the principal vehicle VA from approaching a first adjacent vehicle OV1 traveling from behind the principal vehicle VA.

Second Embodiment

A configuration of a second embodiment will be described with reference to FIGS. 9 to 11. In the first situation, a second adjacent vehicle OV2 may be traveling in the second adjacent lane Ln2. The driving assistance ECU 110 changes the correction value dc depending on cases a to d described below.

Figure 9:
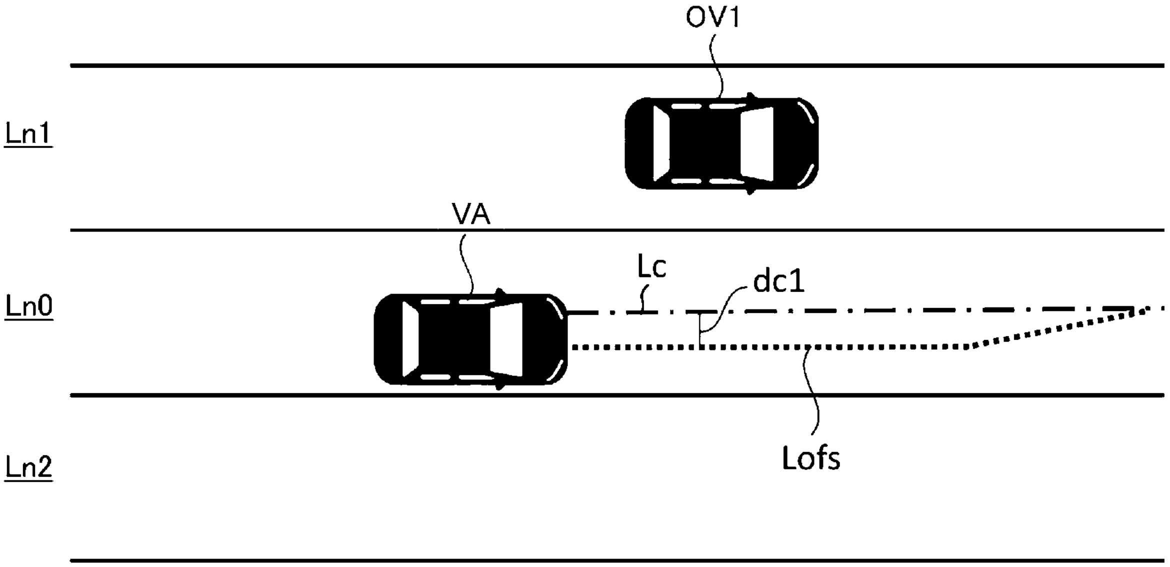
FIG. 9 is a diagram illustrating an example in which no second adjacent vehicle is present in a second adjacent lane in the first situation.
Figure 13:
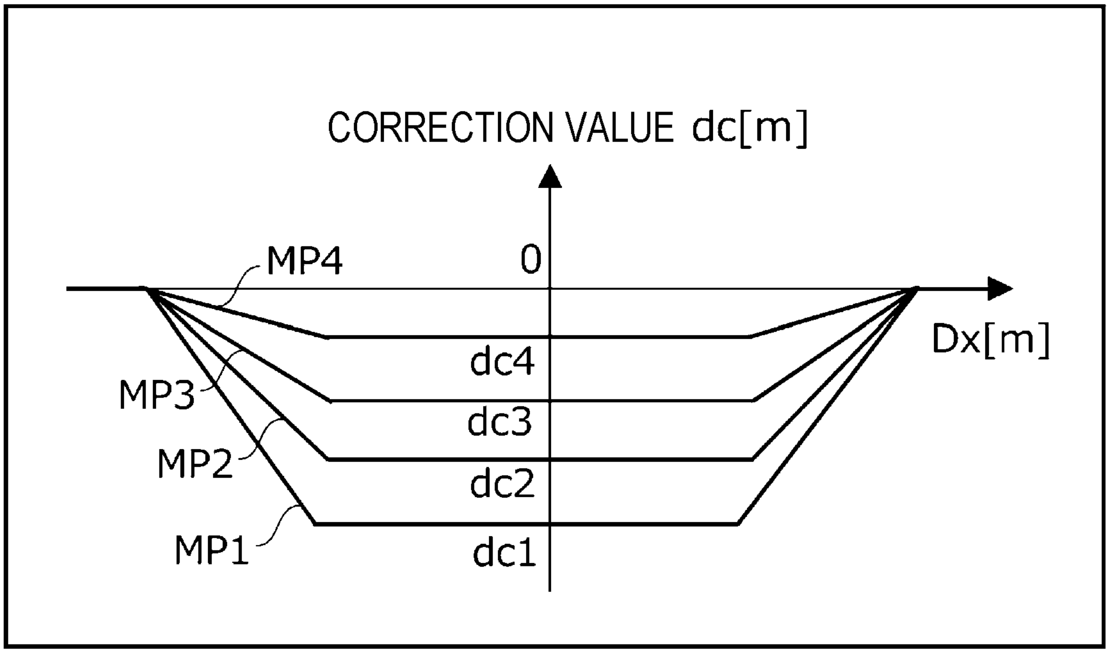
FIG. 13 is an example of a map for obtaining the correction value dc of the lateral position of the principal vehicle in a second embodiment.

In the example of FIG. 9, the principal vehicle VA is about to overtake a first adjacent vehicle OV1. That is, the current situation is the first situation. Meanwhile, no adjacent vehicle is present in the second adjacent lane Ln2. Such a case is hereinafter referred to as "case a". In the case a, the driving assistance ECU 110 obtains the correction value dc in accordance with a map MP1 illustrated in FIG. 13. The minimum value of the correction value dc in the map MP1 is "dc1 (for example, −0.4 m)". Thus, the driving assistance ECU 110 calculates the line Lofs offset by "dc1" to the right side from the center line Lc. The driving assistance ECU 110 sets the line Lofs as the target track TL. In the case a, the sufficient distance is secured between the principal vehicle VA and the first adjacent vehicle OV1, so that the driver's feeling of security can be enhanced.

Figure 10:
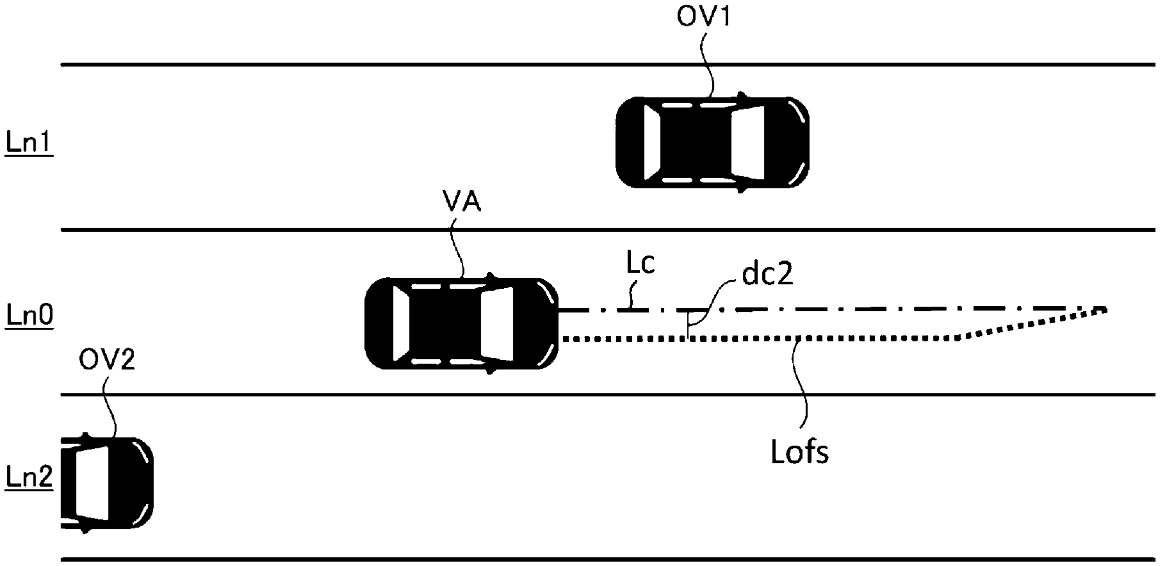
FIG. 10 is a diagram illustrating an example in which a second adjacent vehicle is present in the second adjacent lane in the first situation.

Similarly, in the example of FIG. 10, the principal vehicle VA is about to overtake a first adjacent vehicle OV1. A second adjacent vehicle OV2 is traveling in the second adjacent lane Ln2. Although the second adjacent vehicle OV2 is about to overtake the principal vehicle VA, the distance in the vehicle longitudinal direction between the principal vehicle VA and the second adjacent vehicle OV2 is relatively large (that is, the distance is larger than a predetermined distance). Such a case is hereinafter referred to as "case b". In the case b, the driving assistance ECU 110 obtains the correction value dc in accordance with a map MP2 illustrated in FIG. 13. The minimum value of the correction value dc in the map MP2 is "dc2 (for example, −0.2 m)". Here, dc2>dc1 holds. The driving assistance ECU 110 calculates the line Lofs offset by "dc2" to the right side from the center line Lc. The driving assistance ECU 110 sets the line Lofs as the target track TL. In consideration of the second adjacent vehicle OV2 approaching from behind the principal vehicle VA, the correction value dc is smaller in the case b than in the case a. Therefore, the driver's feeling of security can be enhanced.

Figure 11:
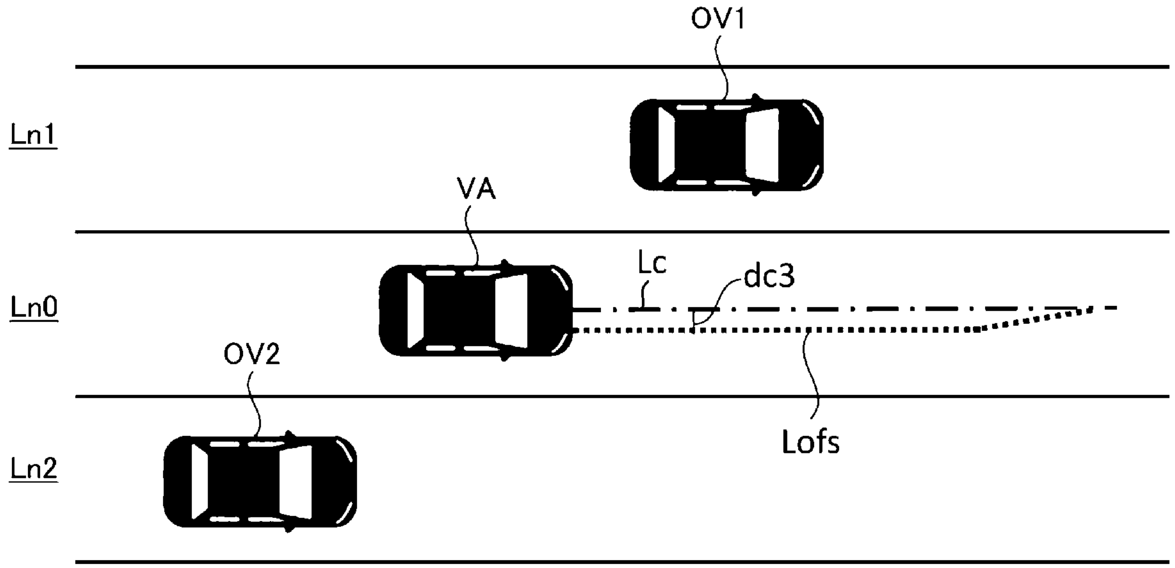
FIG. 11 is a diagram illustrating an example in which a second adjacent vehicle is present in the second adjacent lane in the first situation.

Similarly, in the example of FIG. 11, the principal vehicle VA is about to overtake a first adjacent vehicle OV1 and a second adjacent vehicle OV2 is about to overtake the principal vehicle VA. The distance in the vehicle longitudinal direction between the principal vehicle VA and the second adjacent vehicle OV2 is smaller than that in the example of FIG. 10. Such a case is hereinafter referred to as "case c". In the case c, the driving assistance ECU 110 obtains the correction value dc in accordance with a map MP3 illustrated in FIG. 13. The minimum value of the correction value dc in the map MP3 is "dc3 (for example, −0.1 m)". Here, dc3>dc2 holds. The driving assistance ECU 110 calculates the line Lofs offset by "dc3" to the right side from the center line Lc. The driving assistance ECU 110 sets the line Lofs as the target track TL. The correction value dc is smaller in the case c than in the case b. Therefore, the driver's feeling of security can be enhanced.

Figure 12:
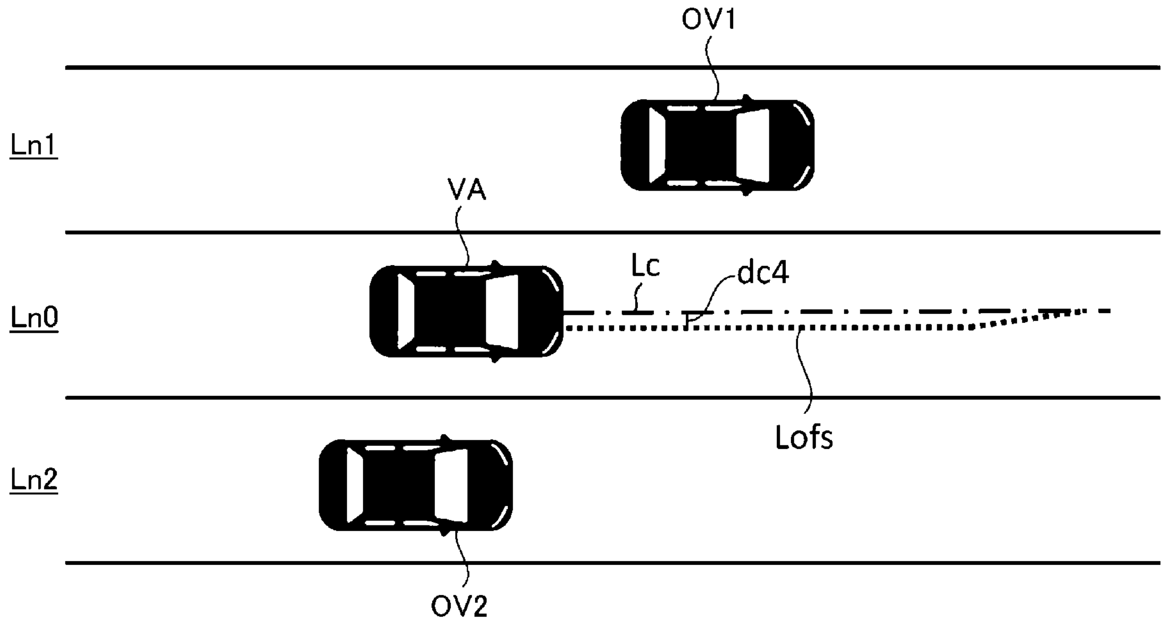
FIG. 12 is a diagram illustrating an example in which a second adjacent vehicle is present in the second adjacent lane in the first situation.

Similarly, in the example of FIG. 12, the principal vehicle VA is about to overtake a first adjacent vehicle OV1 and a second adjacent vehicle OV2 is about to overtake the principal vehicle VA. The distance in the vehicle longitudinal direction between the principal vehicle VA and the second adjacent vehicle OV2 is zero. That is, the second adjacent vehicle OV2 is about to pass by the principal vehicle VA. Such a case is hereinafter referred to as "case d". In the case d, the driving assistance ECU 110 obtains the correction value dc in accordance with a map MP4 illustrated in FIG. 13. The minimum value of the correction value dc in the map MP4 is "dc4 (for example, −0.05 m)". Here, dc4>dc3 holds. The driving assistance ECU 110 calculates the line Lofs offset by "dc4" to the right side from the center line Lc. The driving assistance ECU 110 sets the line Lofs as the target track TL. The correction value dc is smaller in the case d than in the case c. Therefore, the driver's feeling of security can be enhanced. In the case d, dc4 may be zero. In this case, the driving assistance ECU 110 sets the center line Lc as the target track TL. The lateral position of the principal vehicle VA is kept on the center line Lc, so that the driver's feeling of security can be further enhanced.

(Processing Flow)

Figure 14:
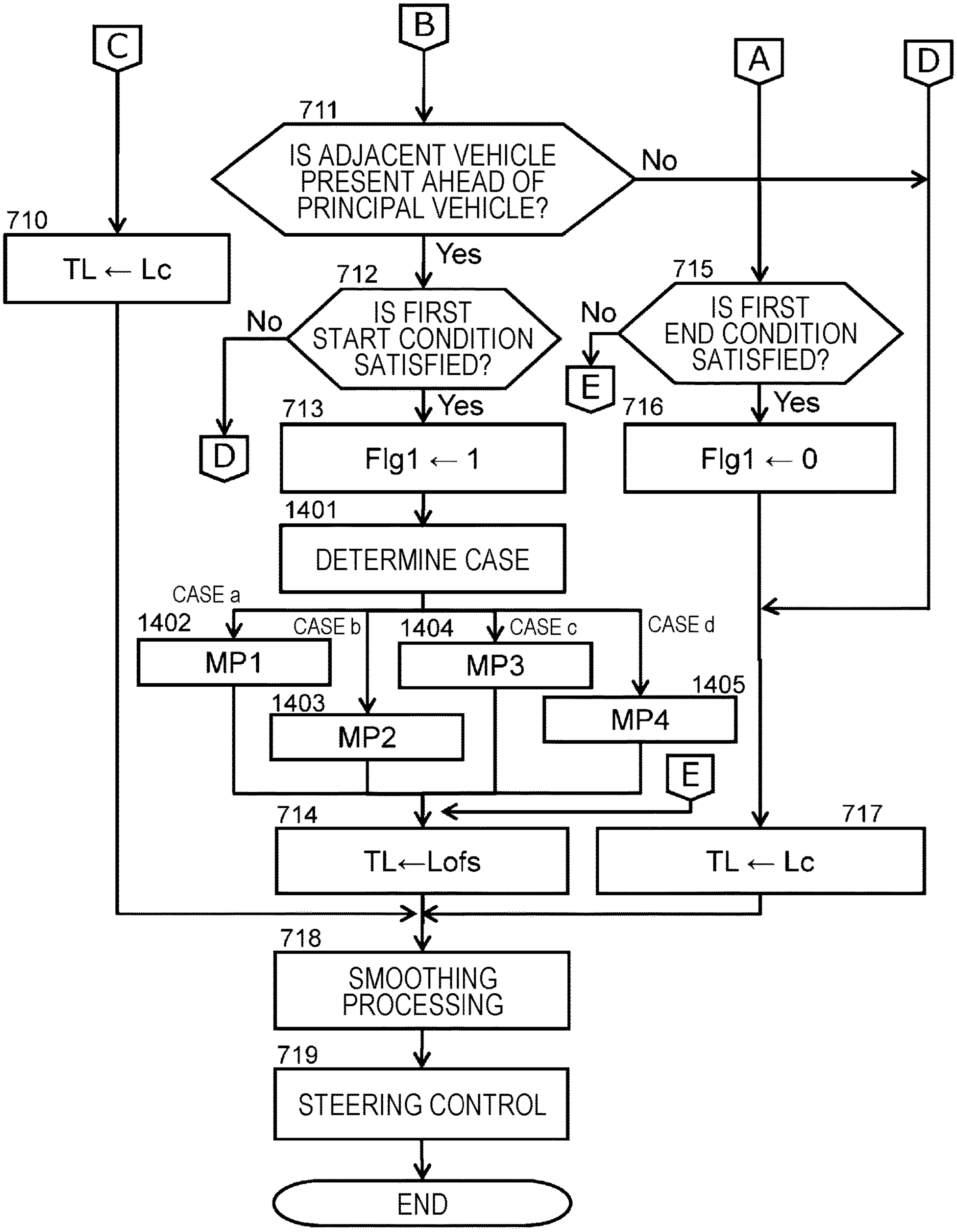
FIG. 14 is a flowchart executed by the driving assistance ECU in the second embodiment.

FIG. 14 is a flowchart illustrating a routine executed by the driving assistance ECU 110 according to the second embodiment. The driving assistance ECU 110 executes the routine of FIG. 14 instead of the routine of FIG. 8. The routine of FIG. 14 differs from the routine of FIG. 8 in that steps 1401 to 1405 are added. Note that the same steps as those in FIG. 8 are denoted by the same reference signs, and will not be described.

When the first start condition is satisfied, the driving assistance ECU 110 determines "Yes" in step 712 and sets the first flag Flg1 to "1" (step 713). Next, the driving assistance ECU 110 determines which one of the cases a to d the current situation corresponds to, based on the vehicle surrounding information (step 1401).

In the case a, the driving assistance ECU 110 selects the map MP1 (step 1402). In the case b, the driving assistance ECU 110 selects the map MP2 (step 1403). In the case c, the driving assistance ECU 110 selects the map MP3 (step 1404). In the case d, the driving assistance ECU 110 selects the map MP4 (step 1405).

Thereafter, the driving assistance ECU 110 calculates the line Lofs using the selected map and sets the line Lofs as the target track TL (step 714). Processing after this step (step 718 and step 719) is the same as that in FIG. 8.

Advantageous Effects

According to the above configuration, the driving assistance ECU 110 determines whether a second adjacent vehicle OV2 is present in the second adjacent lane Ln2, and changes the correction value dc when the second adjacent vehicle OV2 is present. Specifically, the magnitude (absolute value) of the correction value dc decreases as the magnitude (absolute value) of the distance in the vehicle longitudinal direction between the principal vehicle VA and the second adjacent vehicle OV2 decreases. Therefore, the driver's feeling of security can be enhanced.

Modification Example

Note that the driving assistance ECU 110 may be configured to proceed to step 1401 when determining "No" in step 715. In this case, the driving assistance ECU 110 can appropriately select any one of the maps MP1 to MP4 in accordance with a change in a relationship between the principal vehicle VA and the second adjacent vehicle OV2.

In the first control, the driving assistance ECU 110 may set the control gain of the steering control to be larger when a second adjacent vehicle OV2 is present in the second adjacent lane Ln2 (for example, the case b, the case c, or the case d) than when no second adjacent vehicle OV2 is present in the second adjacent lane Ln2 (the case a). In this configuration, for example, when the driver of the principal vehicle VA operates the steering wheel in the case d, the driving assistance ECU 110 applies, to the steering mechanism, a large torque for returning the lateral position of the principal vehicle VA to the target track TL. Thus, the driver feels a large load when operating the steering wheel. Thus, the lateral position of the principal vehicle VA is easily kept on the target track TL. It is possible to prevent the principal vehicle VA from approaching the second adjacent vehicle OV2.

Third Embodiment

Figure 15:
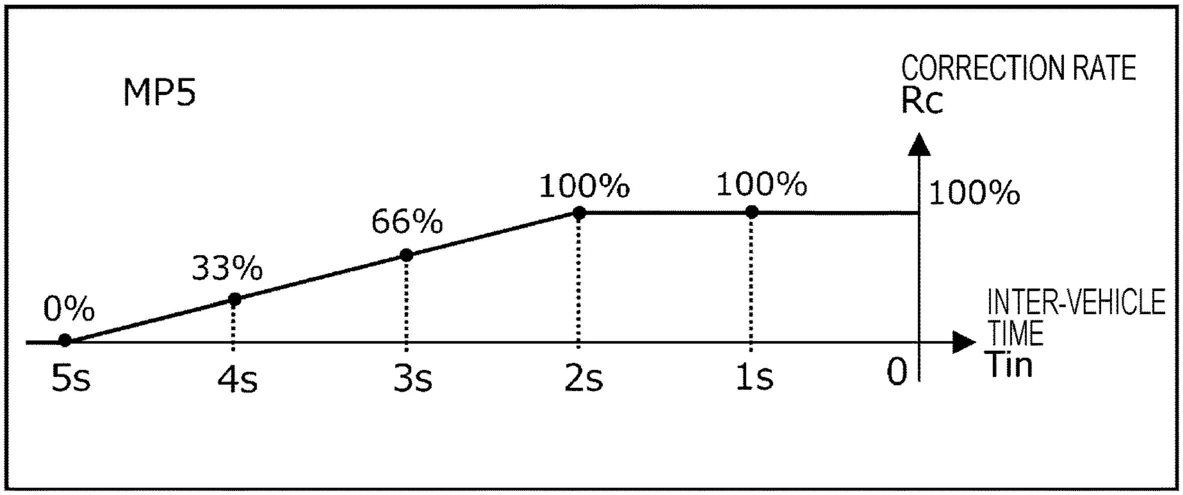
FIG. 15 is an example of a map for obtaining a correction rate Rc by which the correction value dc is multiplied.

A configuration of a third embodiment will be described with reference to FIG. 15. FIG. 15 is a map MP5 for obtaining a correction rate Rc by which the correction value dc1 is multiplied. In the first situation, the driving assistance ECU 110 multiplies the correction value dc1 (for example, −0.4 m) by the correction rate Rc to obtain the final correction value dc of the lateral position of the principal vehicle VA (dc=dc1×Rc).

The map MP5 defines a relationship between the inter-vehicle time Tin and the correction rate Rc, where the inter-vehicle time Tin is a time interval between the principal vehicle VA and a first adjacent vehicle OV1. The driving assistance ECU 110 can calculate the inter-vehicle time Tin based on the relative speed of the first adjacent vehicle OV1 with respect to the principal vehicle VA and the distance Dx. When the inter-vehicle time Tin is 5 s, this means that the principal vehicle VA is present at a relatively distant position behind the first adjacent vehicle OV1. Thus, the correction rate Rc is 0%. In this case, the driving assistance ECU 110 drives along the center line Lc. The correction rate Rc increases as the inter-vehicle time Tin decreases. That is, the magnitude (absolute value) of the final correction value dc increases as the principal vehicle VA approaches the first adjacent vehicle OV1.

(Processing Flow)

The driving assistance ECU 110 according to the third embodiment executes the routine of FIGS. 7 and 8. However, the processing in step 714 is different from that in the first example. In step 714, the driving assistance ECU 110 obtains the correction rate Rc using the map MP5. The driving assistance ECU 110 multiplies the correction value dc1 by the correction rate Rc to obtain the final correction value dc. The driving assistance ECU 110 calculates the line Lofs using the correction value dc and sets the line Lofs as the target track TL.

Advantageous Effects

According to the above configuration, the driving assistance ECU 110 can offset the lateral position of the principal vehicle VA to the right side from the center line Lc in accordance with the inter-vehicle time Tin. The principal vehicle VA passes on the right side of the first adjacent vehicle OV1 with the larger interval from the first adjacent vehicle OV1. The possibility that the driver feels uneasy can be reduced. Further, the driving assistance ECU 110 gradually changes the correction value dc in accordance with the inter-vehicle time Tin using the map MP5. According to this configuration, the lateral position of the vehicle VA can be smoothly changed in accordance with the inter-vehicle time Tin.

Fourth Embodiment

Let us assume that the relative speed of a first adjacent vehicle OV1 with respect to the principal vehicle VA is relatively high in the second situation. In this case, when the first adjacent vehicle OV1 passes by the principal vehicle VA, the principal vehicle VA may wobble in the lateral direction due to wind pressure generated by the passage of the first adjacent vehicle OV1. Thus, the driver of the principal vehicle VA may feel uneasy. Thus, in the second situation, the driving assistance ECU 110 calculates a relative speed Vrs of the first adjacent vehicle OV1 with respect to the principal vehicle VA. The relative speed Vrs is the difference between the speed V1 of the first adjacent vehicle OV1 and the speed Va of the principal vehicle VA (Vrs=V1−Va). When the relative speed Vrs is equal to or higher than a predetermined speed threshold Vrth, the driving assistance ECU 110 executes the first control. On the other hand, when the relative speed Vrs is lower than the predetermined speed threshold Vrth, the driving assistance ECU 110 executes the second control.

(Processing Flow)

Figure 16:
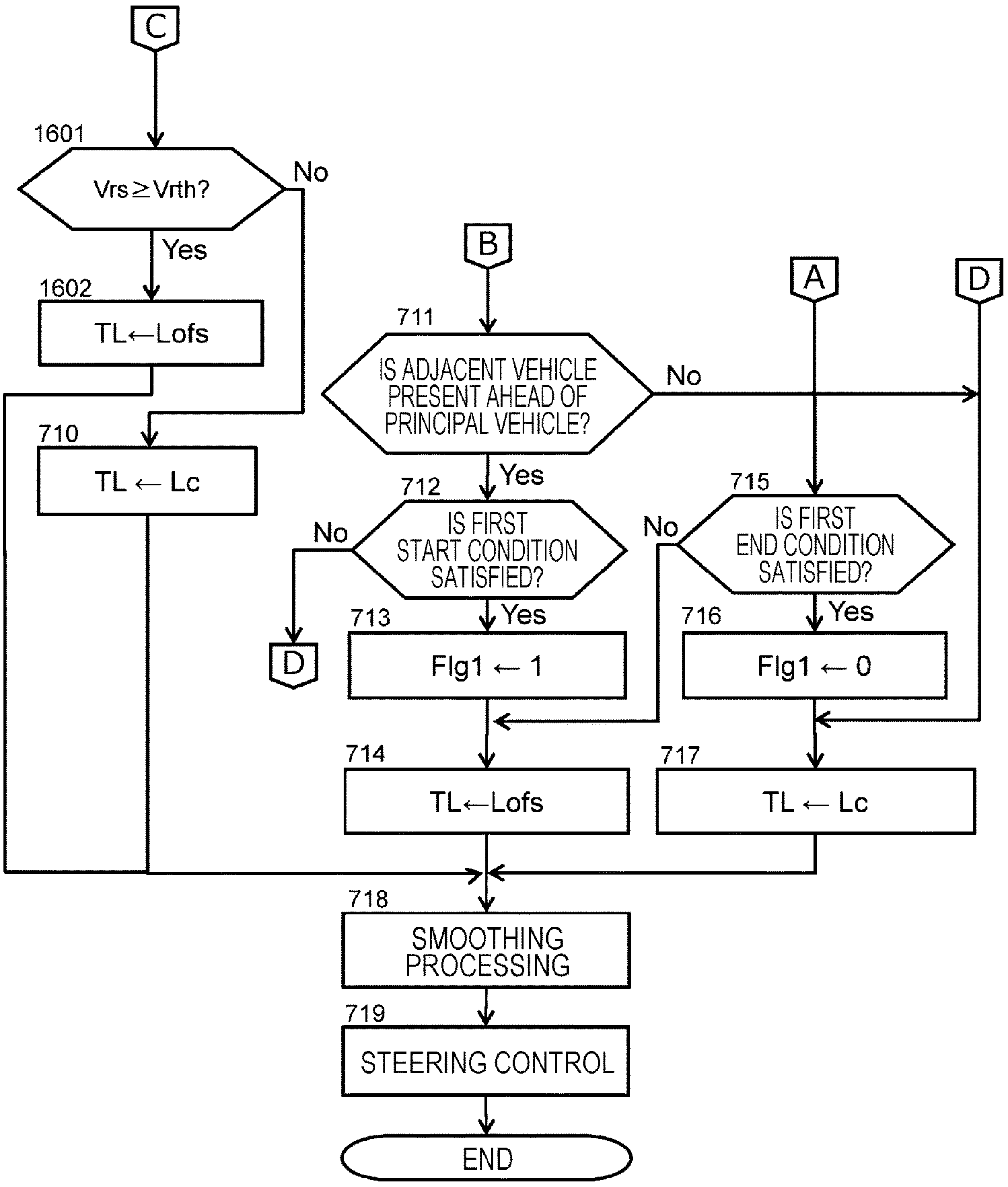
FIG. 16 is a flowchart executed by the driving assistance ECU in a fourth embodiment.

FIG. 16 is a flowchart illustrating a routine executed by the driving assistance ECU 110 according to the fourth embodiment. The driving assistance ECU 110 executes the routine of FIG. 16 instead of the routine of FIG. 8. The routine of FIG. 16 differs from the routine of FIG. 8 in that steps 1601 to 1602 are added. The same steps as those in FIG. 8 are denoted by the same reference signs, and will not be described.

When the second start condition is satisfied in step 706 of the routine of FIG. 7, the driving assistance ECU 110 proceeds to step 1601 via step 707. The driving assistance ECU 110 determines whether the relative speed Vrs is equal to or higher than the predetermined speed threshold Vrth (step 1601). When the relative speed Vrs is equal to or higher than the predetermined speed threshold Vrth, the driving assistance ECU 110 determines "Yes" and proceeds to step 1602. The driving assistance ECU 110 calculates the line Lofs using the correction value dc and sets the line Lofs as the target track TL (step 1602). The correction value dc may be "dc1 (for example, −0.4 m)". The correction value dc may be determined such that it changes in accordance with the distance Dx or the inter-vehicle time Tin as described above. Processing after this step (step 718 and step 719) is the same as that in FIG. 8.

On the other hand, when the relative speed Vrs is not equal to or higher than the predetermined speed threshold Vrth, the driving assistance ECU 110 determines "No" and executes step 710, step 718, and step 719.

Advantageous Effects

According to the above configuration, when the relative speed Vrs is high, the driving assistance ECU 110 executes the first control for setting the target track TL to be further away from the first adjacent lane Ln1. The interval between the principal vehicle VA and the first adjacent vehicle OV1 becomes large. It is possible to reduce the possibility that, when the first adjacent vehicle OV1 passes by the principal vehicle VA, the principal vehicle VA wobbles in the lateral direction due to wind pressure generated by the passage of the first adjacent vehicle OV1. Therefore, it is possible to reduce the possibility that the driver of the principal vehicle VA feels uneasy.

Fifth Embodiment

Figure 17:
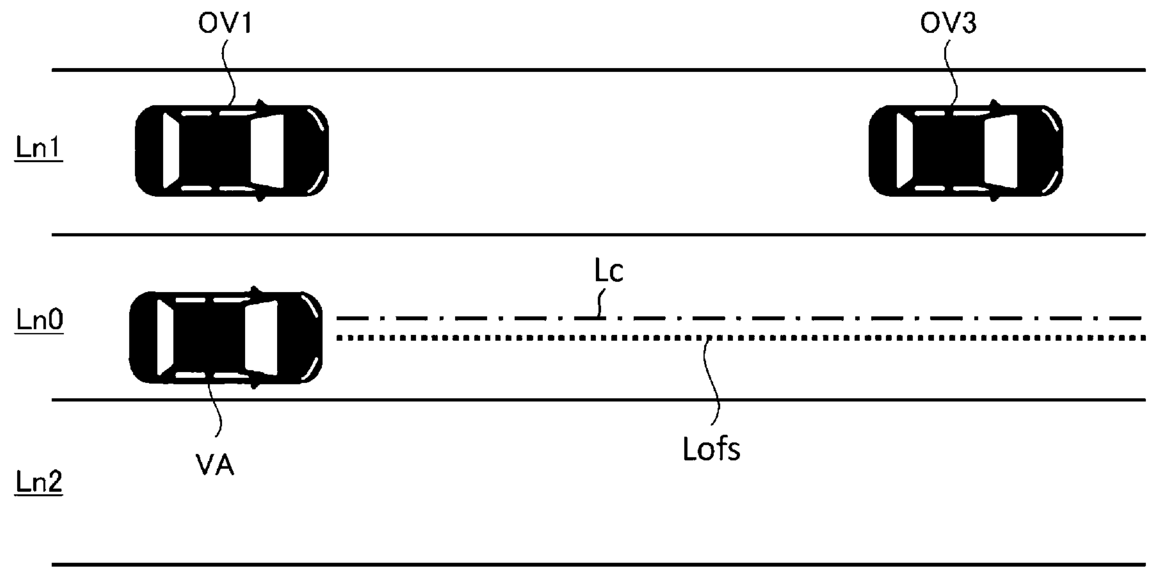
FIG. 17 is a diagram illustrating an example in which further another vehicle is present ahead of a first adjacent vehicle in the first situation.

A configuration of a fifth embodiment will be described with reference to FIG. 17. At the time when the principal vehicle VA has overtaken a first adjacent vehicle OV1 in the first situation, a further adjacent vehicle OV3 may be present ahead of the first adjacent vehicle OV1. In this case, the lateral position of the principal vehicle VA once returns to the center line Lc, and then moves onto the line Lofs again. The principal vehicle VA wobbles in the lateral direction, and thus the driver of the principal vehicle VA may feel uneasy. In consideration of this, when a further adjacent vehicle OV3 is present ahead of a first adjacent vehicle OV1 at the time when the principal vehicle VA has overtaken t first adjacent vehicle OV1, the driving assistance ECU 110 continues the first control. The lateral position of the principal vehicle VA is kept on the line Lofs. It is possible to prevent the principal vehicle VA from wobbling in the lateral direction.

(Processing Flow)

The driving assistance ECU 110 according to the fifth embodiment executes the routine of FIGS. 7 and 8. However, the processing in step 715 is different from that in the first example. In step 715, the driving assistance ECU 110 determines whether the following first end condition is satisfied. The first end condition of this example is satisfied when both of the condition B1 and condition B2 are satisfied.

(Condition B1): distance Dx≥second distance threshold Dxth2 (predetermined positive value)

(Condition B2): No other adjacent vehicle is present within a predetermined distance range ahead of a first adjacent vehicle OV1.

Advantageous Effects

According to the above configuration, when a further adjacent vehicle OV3 is present ahead of the first adjacent vehicle OV1, the driving assistance ECU 110 continues the first control. It is possible to prevent the principal vehicle VA from wobbling in the lateral direction. It is possible to reduce the possibility that the driver of the principal vehicle VA feels uneasy.

Sixth Embodiment

When the speed Va of the principal vehicle VA is considerably higher than the speed V1 of a first adjacent vehicle OV1 in the first situation, the time taken for the principal vehicle VA to overtake the first adjacent vehicle OV1 is short. If the first control causes the principal vehicle VA to move in the lateral direction in a short time, the driver of the principal vehicle VA may feel uneasy. In consideration of this, in the first situation, the driving assistance ECU 110 calculates time Tov taken for the principal vehicle VA to overtake the first adjacent vehicle OV1. When the time Tov is equal to or less than a predetermined time threshold Toth, the driving assistance ECU 110 keeps the current lateral position of the principal vehicle VA.

(Processing Flow)

Figure 18:
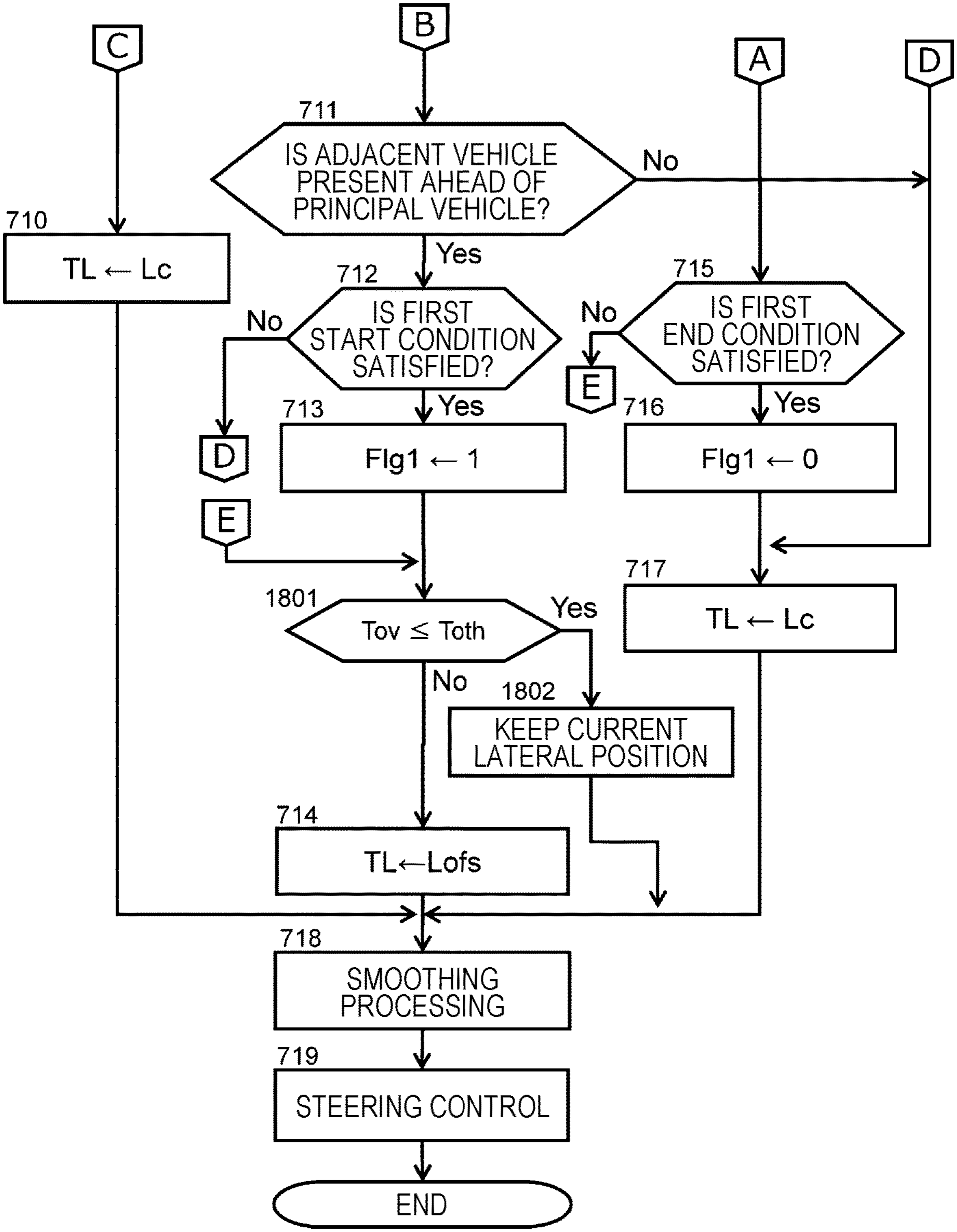
FIG. 18 is a flowchart executed by the driving assistance ECU in a sixth embodiment.

FIG. 18 is a flowchart illustrating a routine executed by the driving assistance ECU 110 according to the sixth embodiment. The driving assistance ECU 110 executes the routine of FIG. 18 instead of the routine of FIG. 8. The routine of FIG. 18 differs from the routine of FIG. 8 in that steps 1801 to 1802 are added. Note that the same steps as those in FIG. 8 are denoted by the same reference signs, and will not be described.

When the first start condition is satisfied (step 712), the driving assistance ECU 110 executes step 713 and proceeds to step 1801. The driving assistance ECU 110 determines whether the time Tov is equal to or less than the time threshold Toth (step 1801). When the time Tov is equal to or less than the time threshold Toth, the driving assistance ECU 110 determines "Yes" and proceeds to step 1802. The driving assistance ECU 110 corrects the target track TL to keep the current lateral position of the principal vehicle VA. Processing after this step (step 718 and step 719) is the same as that in FIG. 8.

On the other hand, when the time Tov is not equal to or less than the time threshold Toth, the driving assistance ECU 110 determines "No" and proceeds to step 714. Processing after this step (step 714, step 718, and step 719) is the same as that in FIG. 8.

Advantageous Effects

According to the above configuration, the driving assistance ECU 110 corrects the target track TL to keep the current lateral position of the principal vehicle VA when the time Tov is equal to or less than the time threshold Toth during execution of the first control. Thus, lateral movements of the principal vehicle VA are suppressed. It is possible to reduce the possibility that the driver of the principal vehicle VA feels uneasy.

Seventh Embodiment

Figures 19, 20:
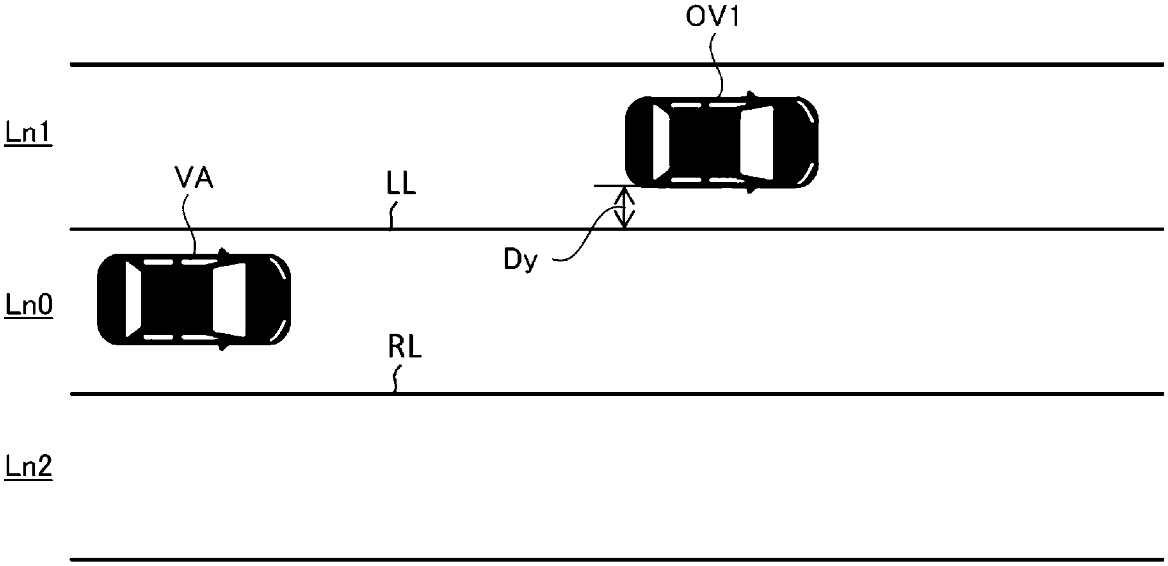
FIG. 19 is a diagram for explaining a distance Dy between a first adjacent vehicle and a lane marking representing a boundary between the principal vehicle lane and the first adjacent lane.
FIG. 20 is a table for calculating a reliability DR, and the table illustrates a relationship between the distance Dy and an addition value/subtraction value.

A configuration of a seventh embodiment will be described with reference to FIG. 19. Accuracy of the vehicle surrounding sensor 140 may be low. The driving assistance ECU 110 uses a reliability DR defined below to accurately determine whether the current situation is the first situation. The reliability DR is an index indicating the likelihood of an approach level between the principal vehicle VA and a first adjacent vehicle OV1. The driving assistance ECU 110 calculates the reliability DR using a distance Dy. As illustrated in FIG. 19, the distance Dy is a distance between a first adjacent vehicle OV1 and the left lane marking LL representing a boundary between the principal vehicle lane Ln0 and the first adjacent lane Ln1. The distance Dy is calculated as a positive value.

The driving assistance ECU 110 performs an addition, subtraction, or maintenance operation on the reliability DR in accordance with the table of FIG. 20 at a predetermined cycle dT (for example, 50 ms). In this example, the upper limit value of the reliability DR is "20", and the lower limit value of the reliability DR is "0". In FIG. 20, $Dy1<Dy2<Dy3$ holds. Upon detecting a first adjacent vehicle OV1, the driving assistance ECU 110 starts calculation of the reliability DR. The reliability DR is "0" at the first time point.

When $Dy<Dy1$, the driving assistance ECU 110 adds "2.0" to the reliability DR. When $Dy1\leq Dy\leq Dy2$, the driving assistance ECU 110 adds "1.0" to the reliability DR. When $Dy2\leq Dy\leq Dy3$, the driving assistance ECU 110 maintains the current reliability DR. When $Dy3<Dy$, the driving assistance ECU 110 subtracts "1.0" from the reliability DR.

The driving assistance ECU 110 determines the start of the first control using the reliability DR. In this example, the first start condition is satisfied when (i) a first adjacent vehicle OV1 is present ahead of the principal vehicle VA, (ii) the speed Va of the principal vehicle VA is higher than the speed V1 of the first adjacent vehicle OV1, and (iii) the reliability DR reaches "20". Similarly, the driving assistance ECU 110 determines the start of the second control using the reliability DR. In this example, the second start condition is satisfied when (i) a first adjacent vehicle OV1 is present behind the principal vehicle VA, (ii) the speed V1 of the first adjacent vehicle OV1 is higher than the speed Va of the principal vehicle VA, and (iii) the reliability DR reaches "20".

The driving assistance ECU 110 may determine the end of the first control using the reliability DR. In this example, the driving assistance ECU 110 gradually decreases the reliability DR after starting the first control. The first end condition is satisfied when the reliability DR reaches a predetermined value (for example, any value between 0 and 10). Similarly, the driving assistance ECU 110 may determine the end of the second control using the reliability DR. In this example, the driving assistance ECU 110 gradually decreases the reliability DR after starting the second control. The second end condition is satisfied when the reliability DR reaches a predetermined value (for example, any value between 0 and 10).

Advantageous Effects

According to the above configuration, the driving assistance ECU 110 determines the first situation or the second situation in accordance with the change in the distance Dy. Even in a case where the accuracy of the vehicle surrounding sensor 140 is low, influence of noise or the like can be reduced and chattering of the determination result can be eliminated as well. It is possible to improve accuracy of the determination of whether the current situation is the first situation or the second situation.

Modification Example

The reliability DR is not limited to the above example, and may be calculated using the relative speed of a first adjacent vehicle OV1 with respect to the principal vehicle VA and/or the distance Dx in the vehicle longitudinal direction between the principal vehicle VA and a first adjacent vehicle OV1.

The driving assistance ECU 110 may perform an addition, subtraction, or maintenance operation on the reliability DR in accordance with the table of FIG. 21 at a predetermined cycle dT (for example, 50 ms). The table of FIG. 21, which is a table used to determine the first situation, is used in a situation where the distance Dx is a negative value. In FIG.

21, Dx1 and Dx2 are both negative values, and Dx1>Dx2 holds. According to this table, the reliability DR increases as the principal vehicle VA approaches a first adjacent vehicle OV1 from behind the first adjacent vehicle OV1. Meanwhile, let us assume that the principal vehicle VA decelerates in the situation where the principal vehicle VA is present behind the first adjacent vehicle OV1, and thereby gradually becomes distant from the first adjacent vehicle OV1. In this case, the reliability DR decreases. In this example, the upper limit value of the reliability DR is "20", and the lower limit value of the reliability DR is "0". The driving assistance ECU 110 determines the start of the first control using the reliability DR. The first start condition is satisfied when the reliability DR reaches "20". Further, the driving assistance ECU 110 determines the end of the first control using the reliability DR. The driving assistance ECU 110 gradually decreases the reliability DR after starting the first control. The first end condition is satisfied when the reliability DR reaches a predetermined value (for example, any value between 0 and 10). According to this configuration, the driving assistance ECU 110 is configured to determine the first situation in accordance with the change in the distance Dx. Even in a case where the accuracy of the vehicle surrounding sensor 140 is low, it is possible to improve accuracy of the determination of the first situation. Note that the driving assistance ECU 110 may determine the second situation using a similar method.

Eighth Embodiment

Figure 22:
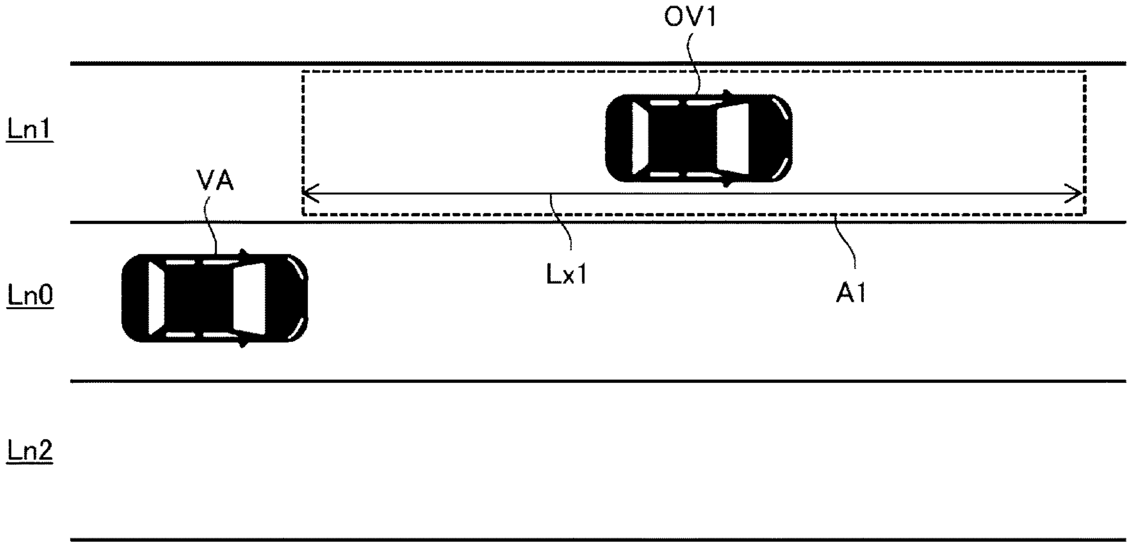
FIG. 22 is a diagram illustrating a first area for determining the first situation.

A configuration of an eighth embodiment will be described with reference to FIG. 22. The driving assistance ECU 110 may set a first area A1 ahead of the principal vehicle VA and in the first adjacent lane Ln1 in order to determine the first situation. The first area A1 is an area for determining whether a first adjacent vehicle OV1 that the principal vehicle VA will overtake is present. The driving assistance ECU 110 may start the first control when a first adjacent vehicle OV1 enters the first area A1. The driving assistance ECU 110 may end the first control when the first adjacent vehicle OV1 leaves the first area A1.

The driving assistance ECU 110 may change a length Lx1 of the first area A1 in a longitudinal direction in accordance with the speed Va of the principal vehicle VA. For example, the length Lx1 may be set to be longer as the speed Va is higher.

Further, the driving assistance ECU 110 may change the length Lx1 of the first area A1 in the longitudinal direction in accordance with a driving curvature of the principal vehicle VA.

Figure 23:
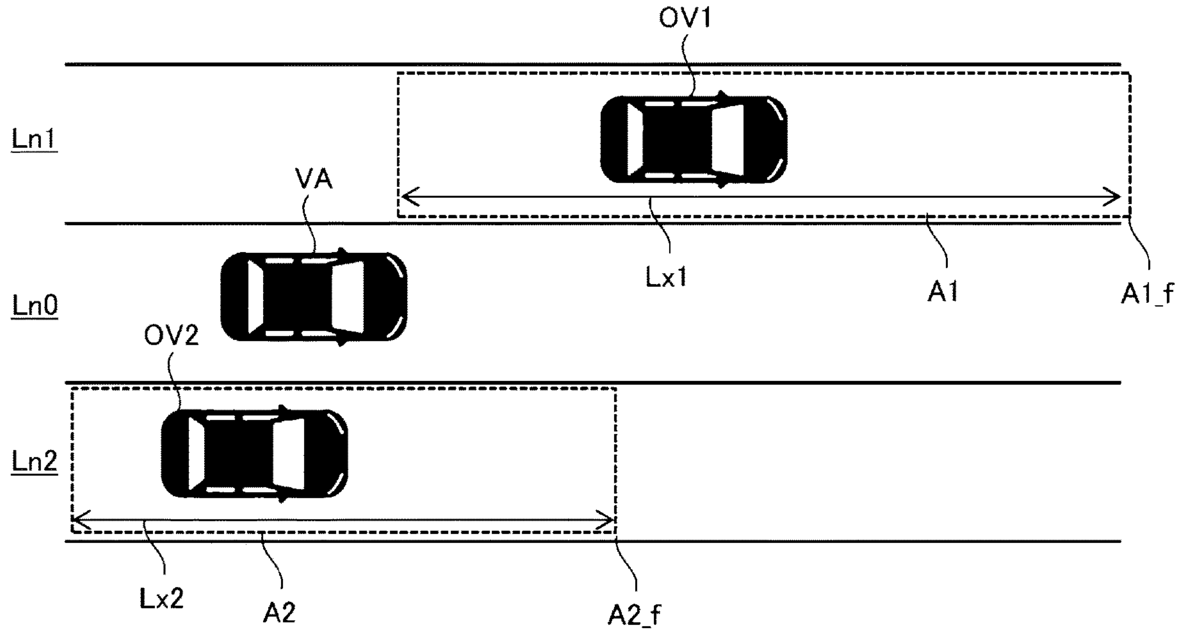
FIG. 23 is a diagram illustrating a second area for determining whether a second adjacent vehicle is present in the second adjacent lane in the first situation.

In another example, as illustrated in FIG. 23, let us assume that the principal vehicle VA is about to overtake a first adjacent vehicle OV1 and a second adjacent vehicle OV2 is about to overtake the principal vehicle VA. In this case, the driving assistance ECU 110 may set a second area A2 in the second adjacent lane Ln2. The second area A2 is used to determine the case d. That is, when a first adjacent vehicle OV1 is present in the first area A1 and a second adjacent vehicle OV2 is present in the second area A2, the driving assistance ECU 110 executes the processing for the case d. The driving assistance ECU 110 obtains the correction value dc in accordance with the map MP4 illustrated in FIG. 13. The driving assistance ECU 110 calculates the line Lofs offset by "dc4" to the right side from the center line Lc. The driving assistance ECU 110 sets the line Lofs as the target track TL.

The second area A2 extends from a position ahead of the principal vehicle VA to a position behind the principal vehicle VA. A length Lx2 of the second area A2 in the longitudinal direction is shorter than the length Lx1 of the first area A1 in the longitudinal direction, and thus the second area A2 is an area smaller than the first area A1. Note that a front end A2_f of the second area A2 is closer to the principal vehicle VA than a front end A1_f of the first area A1. According to this configuration, the driving assistance ECU 110 can accurately determine the case d.

The driving assistance ECU 110 may change the length Lx2 of the second area A2 in the longitudinal direction in accordance with the speed Va of the principal vehicle VA.

Further, the driving assistance ECU 110 may change the length Lx2 of the second area A2 in the longitudinal direction in accordance with the driving curvature of the principal vehicle VA.

Note that the embodiments described above are merely examples, and the scope of the technical idea of the present disclosure is not limited to the above-described configurations. Other aspects conceivable within the scope of the technical idea of the present disclosure also fall within the scope of the present disclosure.

The embodiments and the modifications thereof described above are also applicable to the first situation in which the principal vehicle VA overtakes a second adjacent vehicle OV2 traveling in the second adjacent lane Ln2 and the second situation in which the principal vehicle VA is overtaken by a second adjacent vehicle OV2.

Although embodiments of the present invention have been described in detail above, the present invention is not limited to the embodiments, and various design changes can be made without departing from the spirit of the present invention described in the claims. For example, the above embodiments have been described in detail to clearly explain the present invention, and all the described constituent elements are not necessarily included. In addition, some of constituent elements of a certain embodiment can be replaced with a constituent element of another embodiment. Further, a constituent element of a certain embodiment can be added to a constituent element of another embodiment. Furthermore, some of constituent elements of each embodiment can be subject to addition of another constituent element, deletion, and replacement.

REFERENCE SIGNS LIST

110 driving assistance ECU
120 steering ECU
130 steering actuator
140 vehicle surrounding sensor
150 vehicle speed sensor

The invention claimed is:

1. A driving assistance device comprising:
at least one sensor configured to acquire vehicle surrounding information pertaining to a surrounding area of a principal vehicle; and
at least one processor configured to:
execute determination processing of determining whether a current situation is a first situation or a second situation based on the vehicle surrounding information, wherein the first situation is a situation in which the principal vehicle overtakes a first other vehicle traveling in a first adjacent lane adjacent to a principal vehicle lane in which the principal vehicle is travelling, and the second situation is a situation in which the principal vehicle is overtaken by the first other vehicle;

execute centering control for setting a target track to a center line in the second situation, the center line being a line connecting center positions of the principal vehicle lane in a road width direction; and execute steering control for driving the principal vehicle along the target track based on a result of the determination processing, wherein the at least one processor is configured to execute a first control for setting the target track to be further away from the first adjacent lane in the first situation, and wherein in the first control, the at least one processor is configured to:

determine whether a second other vehicle is present in a second adjacent lane that is adjacent to the principal vehicle lane and is on an opposite side of the first adjacent lane; and set a control gain of the steering control to be larger when the second other vehicle is present than when the second other vehicle is not present.

2. The driving assistance device according to claim 1, wherein the at least one processor is configured to continue the first control when a second other vehicle is present ahead of the first other vehicle in the first adjacent lane.

3. The driving assistance device according to claim 1, wherein the at least one processor is configured to set a line offset by a correction value from the center line as the target track in the first control.

4. The driving assistance device according to claim 3, wherein the at least one processor is configured to change the correction value in accordance with a distance in a vehicle longitudinal direction between the principal vehicle and the first other vehicle or an inter-vehicle time between the principal vehicle and the first other vehicle.

5. The driving assistance device according to claim 3, wherein the at least one processor is configured to:

determine whether a second other vehicle is present in a second adjacent lane that is adjacent to the principal vehicle lane and is on an opposite side of the first adjacent lane; and change the correction value when the second other vehicle is present.

6. The driving assistance device according to claim 5, wherein the at least one processor is configured to:

determine the first situation by using a first area set ahead of the principal vehicle and in the first adjacent lane; and determine whether the second other vehicle is present by using a second area set in the second adjacent lane.

7. The driving assistance device according to claim 1, wherein the at least one processor is configured to correct the target track to keep a current lateral position of the principal vehicle when time taken for the principal vehicle to overtake the first other vehicle is equal to or less than a predetermined time threshold during execution of the first control.

8. The driving assistance device according to claim 1, wherein the at least one processor is configured to execute first control for setting the target track to be further away from the first adjacent lane when a relative speed between the principal vehicle and the first other vehicle is equal to or higher than a predetermined speed threshold in the second situation.

9. The driving assistance device according to claim 1, wherein the at least one processor is configured to determine the first situation or the second situation in accordance with a change in a distance in a road width direction or a distance in a vehicle longitudinal direction between the principal vehicle and the first other vehicle.

10. The driving assistance device according to claim 1, wherein the at least one processor is configured to determine the first situation by using a first area set ahead of the principal vehicle and in the first adjacent lane.

11. The driving assistance device according to claim 10, wherein the at least one processor is configured to change a length of the first area in a vehicle longitudinal direction in accordance with a speed or a driving curvature of the principal vehicle.

* * * * *